(12) United States Patent
Moon et al.

(10) Patent No.: US 10,587,927 B2
(45) Date of Patent: Mar. 10, 2020

(54) ELECTRONIC DEVICE AND OPERATION METHOD THEREOF

(71) Applicant: LG ELECTRONICS INC., Seoul (KR)

(72) Inventors: Kyoungsoo Moon, Seoul (KR); Huisang Yoo, Seoul (KR); Younghun Song, Seoul (KR); Seungjoo An, Seoul (KR); Jinwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/525,895

(22) PCT Filed: Oct. 16, 2015

(86) PCT No.: PCT/KR2015/010963
§ 371 (c)(1),
(2) Date: May 10, 2017

(87) PCT Pub. No.: WO2016/076541
PCT Pub. Date: May 19, 2016

(65) Prior Publication Data
US 2017/0318348 A1 Nov. 2, 2017

(30) Foreign Application Priority Data
Nov. 10, 2014 (KR) ........................ 10-2014-0155419

(51) Int. Cl.
H04N 21/41 (2011.01)
G06Q 10/10 (2012.01)
(Continued)

(52) U.S. Cl.
CPC ..... H04N 21/4788 (2013.01); H04N 21/4126 (2013.01); H04N 21/41407 (2013.01);
(Continued)

(58) Field of Classification Search
None
See application file for complete search history.

(56) References Cited

U.S. PATENT DOCUMENTS 7,787,439 B1    8/2010  Oz et al.
2002/0092021 A1* 7/2002  Yap ............... G11B 27/034
                                                725/55
(Continued)

FOREIGN PATENT DOCUMENTS

EP         2800392       11/2014
KR    10-2013-0020874     3/2013
(Continued)

OTHER PUBLICATIONS

PCT International Application No. PCT/KR2015/010963, International Search Report dated Feb. 5, 2016, 4 pages.
(Continued)

Primary Examiner — Nasser M Goodarzi
Assistant Examiner — Terrika Peterson
(74) Attorney, Agent, or Firm — Lee, Hong, Degerman, Kang & Waimey

(57) ABSTRACT

An electronic device operation method according to an embodiment of the present invention comprises the steps of: acquiring an additional service and uncompressed audiovisual content information acquired through automatic contents recognition (ACR) function by a first device; outputting the incompressible audiovisual content information and the additional service through a first application including a message exchange function; receiving an execution input executing the additional service which is output through the first application; and executing the additional service according to the received execution input.

20 Claims, 28 Drawing Sheets

(51) Int. Cl.

| | |
|---|---|
| *G06Q 50/02* | (2012.01) |
| *H04N 21/4788* | (2011.01) |
| *H04N 21/434* | (2011.01) |
| *H04N 21/4402* | (2011.01) |
| *H04N 21/81* | (2011.01) |
| *H04N 21/462* | (2011.01) |
| *H04N 21/414* | (2011.01) |
| *H04N 21/44* | (2011.01) |
| *H04N 21/478* | (2011.01) |
| *H04N 21/488* | (2011.01) |
| *G10L 15/22* | (2006.01) |
| *G06Q 30/02* | (2012.01) |

(52) U.S. Cl.
CPC ....... *H04N 21/434* (2013.01); *H04N 21/4402* (2013.01); *H04N 21/44008* (2013.01); *H04N 21/4622* (2013.01); *H04N 21/47815* (2013.01); *H04N 21/4882* (2013.01); *H04N 21/812* (2013.01)

(56) References Cited

U.S. PATENT DOCUMENTS

| | | | | |
|---|---|---|---|---|
| 2006/0031367 | A1* | 2/2006 | Buford | H04L 51/04 709/207 |
| 2006/0059521 | A1* | 3/2006 | Lee | G06Q 10/109 725/58 |
| 2010/0077435 | A1* | 3/2010 | Kandekar | G11B 27/005 725/61 |
| 2010/0121861 | A1* | 5/2010 | Marsden | G06Q 50/02 707/752 |
| 2010/0146419 | A1* | 6/2010 | Castelli | G06Q 30/02 715/764 |
| 2013/0047178 | A1* | 2/2013 | Moon | H04N 21/4122 725/25 |
| 2014/0123204 | A1 | 5/2014 | Moon et al. | |
| 2014/0201179 | A1* | 7/2014 | Chang | G06F 9/45533 707/706 |
| 2015/0020094 | A1 | 1/2015 | Moon et al. | |
| 2015/0382047 | A1* | 12/2015 | Van Os | G10L 15/22 725/38 |
| 2019/0081992 | A1* | 3/2019 | Lin | H04L 67/12 |

FOREIGN PATENT DOCUMENTS

| | | |
|---|---|---|
| KR | 10-2014-00016906 | 2/2014 |
| KR | 10-2013-0135567 | 7/2014 |
| KR | 10-2014-0094629 | 7/2014 |

OTHER PUBLICATIONS

European Patent Office Application Serial No. 15859679.1, Search Report dated Jul. 10, 2018, 9 pages.

* cited by examiner

SERVICE SCENARIOS (Interworking App)

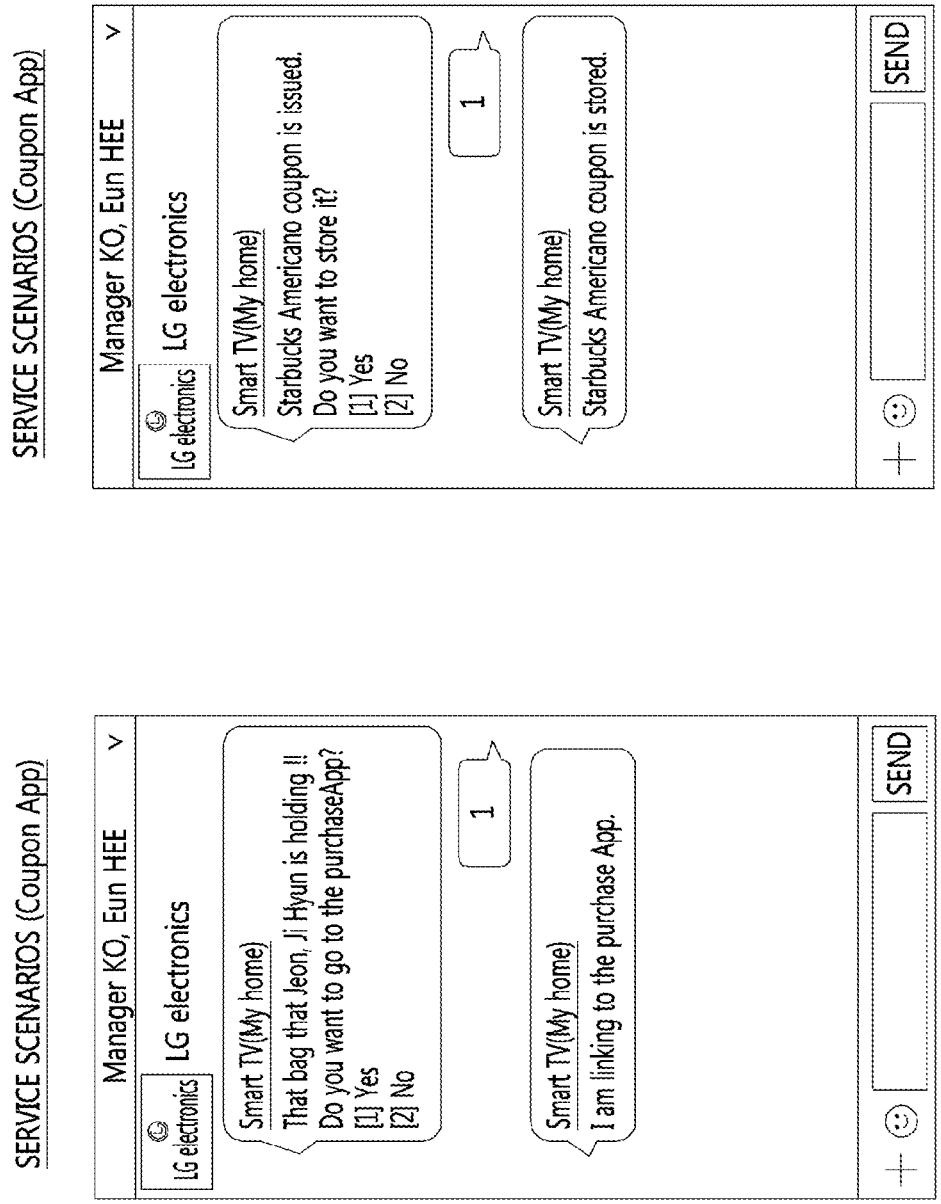

ELECTRONIC DEVICE AND OPERATION METHOD THEREOF

CROSS-REFERENCE TO RELATED APPLICATIONS

This application is the National Stage filing under 35 U.S.C. 371 of International Application No. PCT/KR2015/010963, filed on Oct. 16, 2015, which claims the benefit of earlier filing date and right of priority to Korean Application No. 10-2014-0155419, filed on Nov. 10, 2014, the contents of which are all hereby incorporated by reference herein in their entirety.

TECHNICAL FIELD

The present invention relates to an electronic device and an operation method thereof. More particularly, the present invention relates to an electronic device capable of controlling various services through the interworking with an image display device, and an operating method thereof.

BACKGROUND ART

As digital broadcasting is actively performed, a broadcasting station transmits main audio-visual content together with enhanced service data which is able to be used by linking with the main audio-visual content or independently from the main audio-visual content.

Under a current broadcast environment, an image display device at each home rarely receives a broadcast signal through a sky radio wave. Rather, the image display device at each home is connected with a broadcast receive device, such as a set-top box, and thus mainly reproduces uncompressed audio-visual content provided by the broadcast receive device.

Although the image display device at the home requires a specific input to control the enhanced service data, a remote controller, which controls the image display device, has a limitation in providing the specific input. In addition, in the middle of displaying a user interface used for the enhanced service data on the image display device, a user may be interrupted when viewing the main content.

DISCLOSURE

Technical Problem

The present invention is to provide an image display device, capable of recognizing uncompressed audio-visual content and providing the recognized uncompressed audio-visual content and relevant enhanced service data to a user, and an operating method thereof.

In addition, the present invention is to provide an image display device, capable of notifying a user of recognized uncompressed audio-visual content and relevant enhanced service data through a mobile messenger, and of controlling the enhanced service data associated with the uncompressed audio-visual content through a control command input to the mobile messenger, and an operating method thereof.

Technical Solution

According to an embodiment of the present invention, there is provided an operating method of an electronic device. The operating method includes acquiring, by a first device, uncompressed audio-visual content information and enhanced service through an automatic contents recognition (ACR) function, outputting the uncompressed audio-visual content and the enhanced service through a first application including a mutual message exchange function, receiving an input of executing enhanced service output through the first application, and executing enhanced service according to the received execution input.

Advantageous Effects

According to an embodiment of the present invention, the enhanced service, which does not depend on the MVPD, is possible. In particular, according to an embodiment of the present invention, even if the broadcasting station or the content provider does not provide the enhanced service, the enhanced service may be provided by a third party server which does not depend on the broadcasting station or the content provider.

In addition, according to various embodiments of the present invention, information search, chatting, news search, digital media download, product catalog download, and product purchase are possible in relation to the main audio-visual content through the mobile messenger without inconveniently inputting a text through the remote controller.

In addition, according to an embodiment of the present invention, the enhanced service exceeding the limit value of a bandwidth of a wireless channel is possible.

According to an embodiment of the present invention, the image display device may acquire the channel map based on the uncompressed audio-visual data input through an external input.

According to an embodiment of the present invention, the third party server may provide information on the tolerance of the lean back application to the image display device, thereby preventing the lean back application from severely affecting the stability of the image display device.

According to an embodiment of the present invention, the URL address of the ACR server, which is locally close to the image display device, is notified, so that the image display device may rapidly recognition of content and may reduce the network latency.

According to an embodiment of the present invention, the third party server provides the information on the ACR on-time section to the image display device thereby preventing resources from being unnecessarily wasted.

According to various embodiments of the present invention, the display device may recognize content and may effectively control the service related to the recognized content through the messenger application.

In addition, according to an embodiment of the present invention, the menu for providing the service related to the content is provided through the second screen instead of the screen of the display device, thereby minimizing the user inconvenience of viewing.

DESCRIPTION OF DRAWINGS

FIG. 36 is a view showing that a coupon service is provided as one example of an enhanced service.

FIG. 37 is a view showing that an image display device recognizes an indirect advertisement, which is inserted into an audio-visual content, as one example of an enhanced service to provide a purchase service.

BEST MODE

Mode for Invention

Description will now be given in detail according to exemplary embodiments disclosed herein, with reference to the accompanying drawings. In general, a suffix such as "engine", "module" and "unit" may be used to refer to elements or components. Use of such a suffix herein is merely intended to facilitate description of the specification, and the suffix itself is not intended to give any special meaning or function.

Hereinafter, a network topology according to an embodiment of the present invention will be described with reference to FIGS. 1 to 9.

Figure 1:
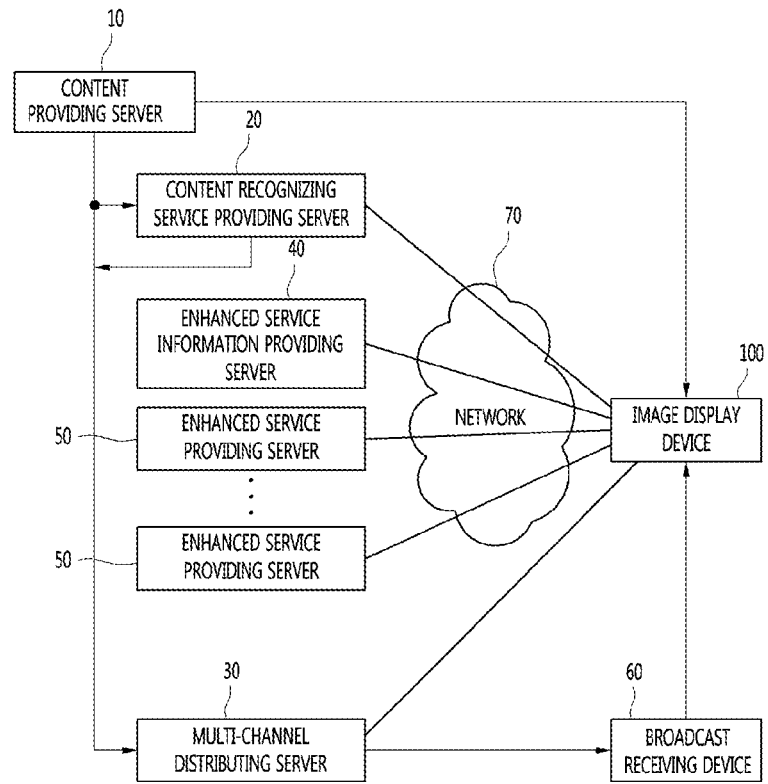
FIG. 1 is a block diagram showing a network topology according to an embodiment of the present invention.

FIG. 1 is a block diagram showing the network topology according to the embodiment of the present invention.

As shown in FIG. 1, according to an embodiment of the present invention, the network topology includes a content providing server 10, a content recognizing service providing server 20, a multi-channel video distributing server 30, an enhanced service information providing server 40, a plurality of enhanced service providing servers 50, a broadcast receiving device 60, a network 70, and an image display device 100.

The content providing server 10 may correspond to a broadcasting station and broadcasts a broadcast signal including main audio-visual content. The broadcast signal may further include an enhanced service. The enhanced service may or may not be associated with main audio-visual content. The enhanced service may have a format such as service information, metadata, additional data, a compiled execution file, a web application, a Hypertext Markup Language (HTML) document, an XML document, a cascading style Sheet (CSS) document, an audio file, a video file, ATSC 2.0 content, and an address such as Uniform Resource Locator (URL). There may be at least one content providing server.

The content recognizing service providing server 20 provides a content recognizing service that allows the image display device 100 to recognize content based on the main audio-visual content. The content recognizing service providing server 20 may or may not modify the main audio-visual content. There may be at least one content recognizing service providing server.

The content recognizing service providing server 20 may be a watermark server that modifies the main audio-visual content to insert a visible watermark, such as a logo, into the main audio-visual content. This watermark server may watermark the logo of a content provider at the upper-left or upper-right of each frame in the main audio-visual content.

In addition, the content recognizing service providing server 20 may be a watermark server that modifies the main audio-visual content to insert content information into the main audio-visual content as an invisible watermark.

Additionally, the content recognizing service providing server 20 may be a fingerprint server that extracts and stores feature information from some frames or some audio samples of the main audio-visual content. This feature information is called signature.

The multi-channel video distributing server 30 receives and multiplexes broadcast signals from a plurality of broadcasting stations and provides the multiplexed broadcast signals to the broadcast receiving device 60. In particular, the multi-channel video distributing server 30 performs demodulation and channel decoding on the received broadcast signals to extract main audio-visual content and enhanced service, and then, to perform channel encoding with respect to the extracted main audio-visual content and enhanced service, thereby generating a multiplexed signal for distribution. At this case, since the multi-channel video distributing server 30 may exclude the extracted enhanced service or may add another enhanced service, a broadcasting station may not provide a broadcasting station-led service. There may be at least one multi-channel video distributing server.

The broadcast receiving device 60 may tune a channel selected by a user and receives a signal of the tuned channel, and then, performs demodulation and channel decoding with respect to the received signal to extract a main audio-visual content. The broadcasting device 60 decodes the extracted main audio-visual content through H. 264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the image display device 100 through an external input port of the image display device.

The enhanced service information providing server 40 provides enhanced service information on at least one available enhanced service associated with the main AV content in response to a request of an image display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service associated with the main AV content in response to a request of the image display device. There may be at least one enhanced service providing server.

The image display device 100 may be a device, such as a television, a notebook computer, a cellular phone, or a smart phone, which includes a display unit. The image display device 100 may receive uncompressed main AV content from the broadcast receiving device 60 or a broadcast signal including encoded main AV content from the contents providing server 10 or the multi-channel video distributing server 30. The image display device 100 may receive a content recognizing service from the content recognizing service providing server 20 through the network 70, may address an address of at least one available enhanced service associated with the main AV content from the enhanced service information providing server 40 through the network 70, and may receive at least one available enhanced service associated with the main AV content from the enhanced service providing server 50.

At least two of the content providing server 10, the content recognizing service providing server 20, the multi-channel video distributing server 30, the enhanced service information providing server 40, and a plurality of enhanced service providing servers 50 may be combined in a form of one server and may be operated by one provider.

Figure 2:
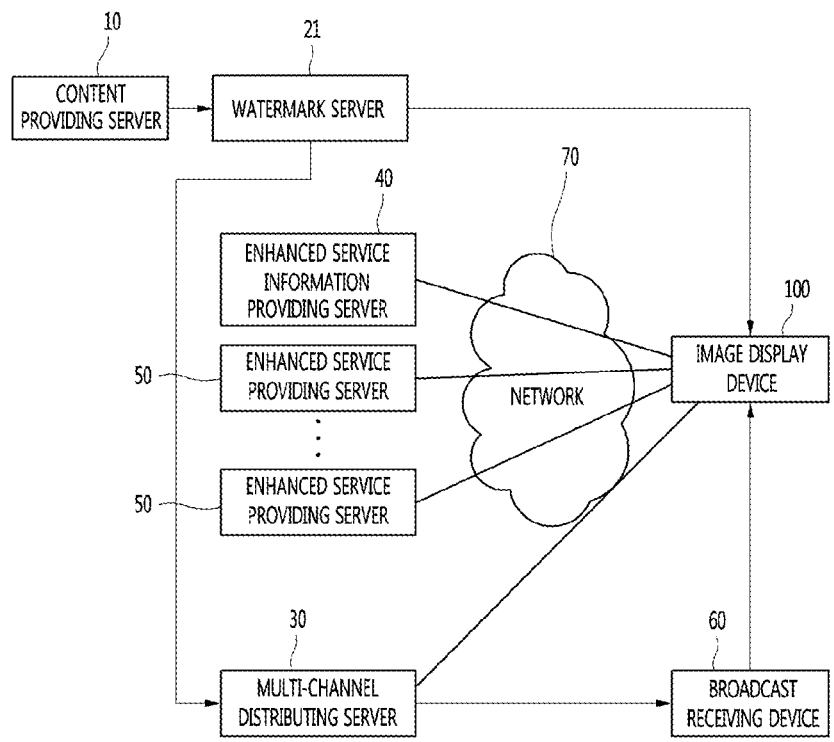
FIG. 2 is a block diagram showing a watermark based network topology according to an embodiment of the present invention.

FIG. 2 is a block diagram showing a watermark based network topology according to an embodiment of the present invention. As shown in FIG. 2, according to an embodiment of the present invention, the watermark based network topology may further include a watermark server 21.

As shown in FIG. 2, the watermark server 21 modifies the main AV content to insert content information into the main AV content. The multi-channel video distributing server 30 may receive and distribute a broadcast signal including the modified main AV content. In particular, a watermark server may use a digital watermarking technique as described below.

A digital watermark is a process for inserting information into a digital signal, which is difficult in deletion. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. A television broadcasting station adds the logo thereof in a corner of a video, and this is an identifiable watermark.

In the invisible watermarking, although information is added to digital data, such as audio, a picture, or video, a user may not guess a predetermined amount of information inserted into the digital data but may not recognize the information. A secret message may be transmitted through the invisible watermarking.

One application of the watermarking is a copyright protection system for preventing the illegal copy of digital media. For example, a copy device obtains a watermark from digital media before copying the digital media and determines whether to copy or not, based on of the content of the watermark.

Another application of the watermarking is source tracking of digital media. A watermark is embedded in the digital media at each point on a distribution path. If such digital media is found later, the watermark may be extracted from the digital media and a distribution source may be recognized from the content of the watermark.

Still another application of the invisible watermarking is a description for digital media.

A file format for digital media may include additional information called metadata and a digital watermark is distinguished from metadata in that it is delivered as an AV signal itself of the digital media.

The watermarking method may include spread spectrum, quantization, and amplitude modulation.

If a marked signal is obtained through additional modification, the watermarking method corresponds to the spread spectrum. Although it is known that the spread spectrum watermark is significantly strong, a small amount of information is contained since the watermark interferes with an embedded host signal.

If the marked signal is obtained through the quantization, the watermarking method corresponds to a quantization type. The quantization watermark is weak, a large amount of information may be contained.

If the marked signal is obtained through an additional modifying method similar to the spread spectrum in the spatial domain, the watermarking method corresponds to the amplitude modulation.

Figure 3:
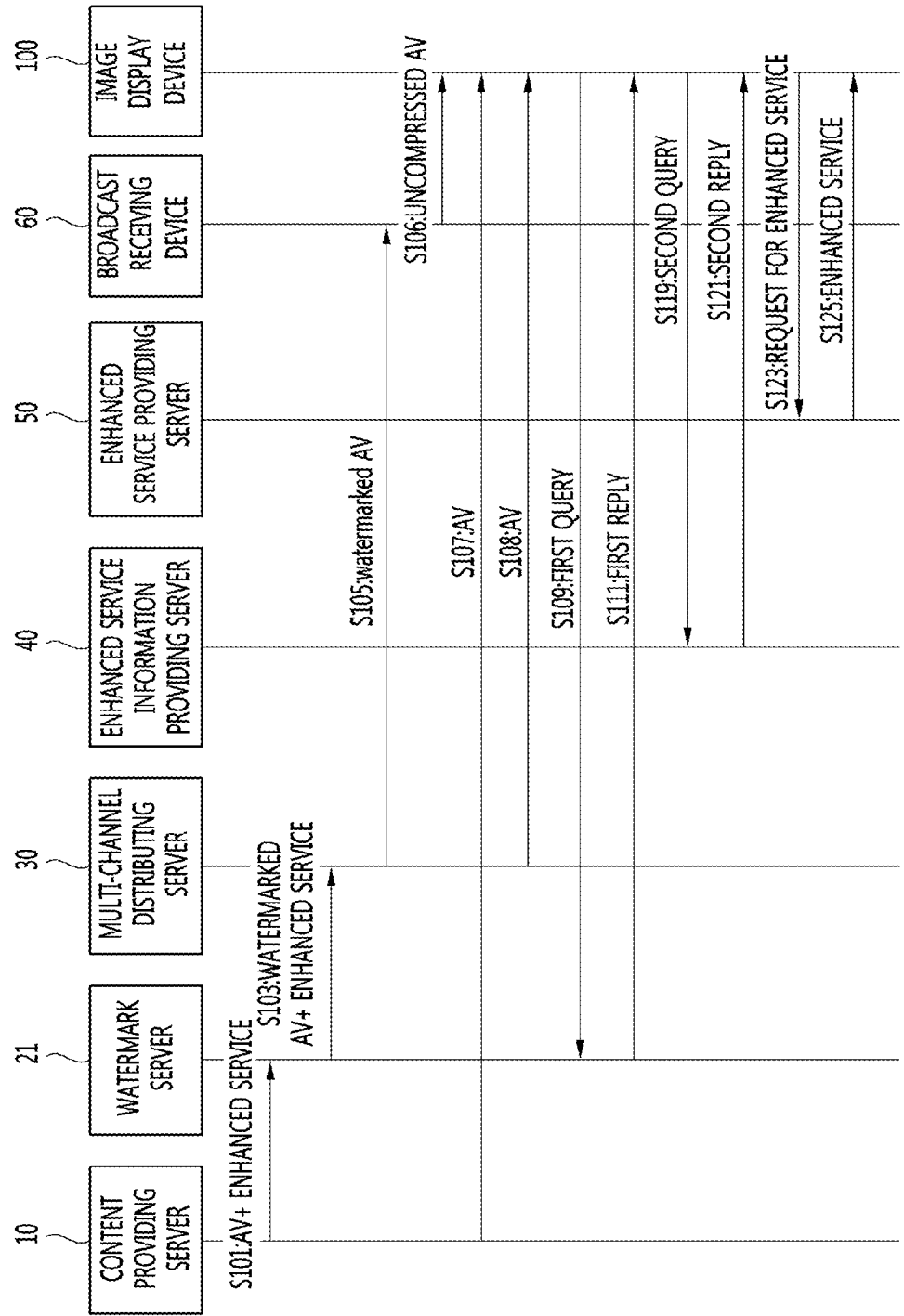
FIG. 3 is a ladder diagram showing a data flow in a watermark based network topology according to an embodiment of the present invention.

FIG. 3 is a ladder diagram showing a data flow in a watermark based network topology according to an embodiment of the present invention.

First, the content providing server 10 transmits a broadcast signal including the main AV content and the enhanced service (S101).

The watermark server 21 receives a broadcast signal that the content providing server 10 provides, inserts visible watermark, such as a logo, or inserts watermark information serving as an invisible watermark into the main AV content by modifying the main AV content, and provides the watermarked main AV content and enhanced service to the MVPD 30 (S103).

The watermark information inserted through an invisible watermark may include at least one of a watermark use purpose, content information, enhanced service information, and an available enhanced service. The watermark use purpose represents one of illegal copy prevention, viewer ratings, and enhanced service acquisition.

The content information may include at least one of identification information of a content provider that provides the main AV content, main AV content identification information, main AV content level information time information of a content interval used in content information acquisition, names of channel through which main AV content is broadcasted, logos of channel through which main AV content is broadcasted, descriptions of channels through which main AV content is broadcasted, a use information reporting address, a usage information reporting period, the minimum usage time for usage information acquisition, and available enhanced service information associated with main AV content.

If the image display device 100 uses a watermark no acquire content information, the time information of a content interval used for content information acquisition may be the time information of a content interval into which a watermark used is embedded. If the image display device 100 uses a fingerprint no acquire content information, the time information of a content interval used for content information acquisition may be the time information of a content interval where feature information is extracted. The time information of a content interval used for content information acquisition may include at least one of the start time of a content interval used for content information acquisition, the duration of a content interval used for content information acquisition, and the end time of a content interval used for content information acquisition.

The usage information reporting address may include at least one of the main AV content watching information reporting address and an enhanced service usage information reporting address. The usage information reporting period may include at least one of the main AV content watching information reporting period and an enhanced service usage information reporting period. A minimum usage time for usage information acquisition may include at least one of a minimum watching time for the main AV content watching information acquisition and a minimum usage time for enhanced service usage information extraction.

On the basis that main AV content is viewed for more than the minimum watching time, the image display device 100 acquires viewing information of the main AV content and reports the acquired watching information to the main AV content watching information reporting address in the main AV content watching information reporting period.

On the basis that an enhanced service is used for more than the minimum usage time, the image display device 100 acquires enhanced service usage information and reports the acquired usage information to the enhanced service usage information reporting address at the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of the main AV content.

For example, the watermark server 21 may insert a barcode at a predetermined position of a logo. In this case, the predetermined position of she logo may correspond to the first line at the bottom of an area where the logo is displayed. The image display device 100 may not display a barcode when receiving the main AV content including a logo with the barcode inserted.

For example, the watermark server 21 may insert watermark information as metadata of the logo. In this case, the shape of the logo may be maintained.

For example, the watermark server 21 may insert N-bit watermark information INT into each of the logos of M frames. In other words, the watermark server 21 may insert M*N watermark information through M frames.

The MVPD 30 receives a broadcast signal including watermarked main AV content and enhanced service and generates a multiplexed signal to be provided the broadcast receiving device 60 (S105). At this point, the multiplexed signal may exclude the received enhanced service or may include new enhanced service.

The broadcast receiving device 60 tunes a channel selected by a user and receives signals of she tuned channel, demodulates the received broadcasting signal, performs channel decoding and AV decoding on the demodulated signals to generate uncompressed main AV content, and then, provides the generated uncompressed main AV content to the image display device 100 (S106).

Moreover, the content providing server 10 also broadcasts a broadcast signal including the main AV content through a wireless channel (S107).

In addition, the MVPD 30 may directly transmit a broadcast signal including the main AV content to the image display device 100 without going through the broadcast receiving device 60 (S108).

The image display device 100 may receive an uncompressed main AV content through the broadcast receiving device 60. Additionally, the image display device 100 may receive a broadcast signal through a wireless channel, and then, may demodulate and decode the received broadcast signal to obtain the main AV content. Additionally, the image display device 100 may receive a broadcast signal from the MVPD 30, and then, may demodulate and decode the received broadcast signal to obtain the main AV content. The image display device 100 extracts watermark information from some frames Cr a section of audio samples of she obtained main AV content. If watermark information corresponds so a logo, she image display device 100 confirms a watermark server address corresponding to a logo extracted from a corresponding relationship between a plurality of logos and a plurality of watermark server addresses. When the watermark information corresponds to the logo, the image display device 100 cannot identify the main AV content only with the logo. Additionally, when the watermark information does not include content information, the image display device 100 cannot identify the main AV content but the watermark information may include consent provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify the main AV content the image display device 100 only with the watermark information, it accesses the watermark server 21 corresponding to the obtained watermark server address to transmit a first query (S109).

The watermark server 21 provides a first reply to the first query (S111). The first reply may include at least one of content information, enhanced service information, and an available enhanced service.

If the watermark information and the first reply do not include an enhanced service address, the image display device 100 cannot obtain enhanced service. However, the watermark information and the first reply may include an enhanced service address providing server address. In this manner, the image display device 100 does not obtain a service address or enhanced service through the watermark information and the first reply. If the image display device 100 obtains an enhanced service address providing server address, it accesses the enhanced service information providing server 40 corresponding to the obtained enhanced service address providing server address to transmit a second query including content information (S119).

The enhanced service information providing server 40 searches at least one available enhanced service relating so the content information of the second query. Thereafter, the enhanced service information providing server 40 provides to the image display device 100 enhanced service information for at least one available enhanced service as a second reply to the second query (S121).

If the image display device 100 obtains at least one available enhanced service address through the watermark information, the first reply, or the second reply, it accesses the at least one available enhanced service address to request enhanced service (S123), and then, obtains the enhanced service (S125).

Figure 4:
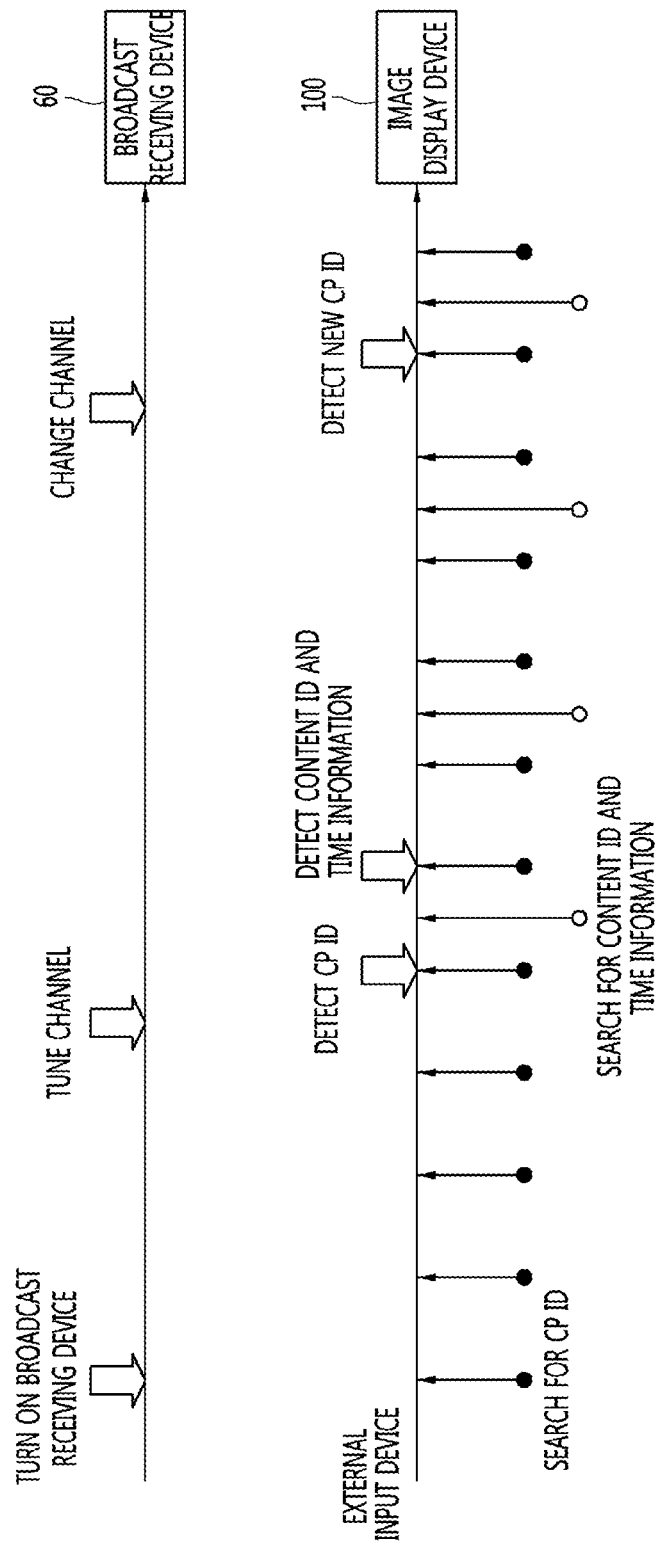
FIG. 4 is view showing a watermark based content recognition timing according to an embodiment of the present invention.

FIG. 4 is a view showing a watermark based content recognition timing according to an embodiment of the present invention.

As shown in FIG. 4, when the broadcast receiving device 60 is turned on and tunes a channel, and also, the image display device 100 receives the main AV content of the turned channel from the broadcast receiving device 60 through an external input port 111, the image display device 100 may sense a content provider identifier (or a broadcasting station identifier) from the watermark of the main AV content. Then, the image display device 100 may sense content information from the watermark of the main AV content on the basis of the sensed content provider identifier.

Ac this point, as shown in FIG. 4, the detection available period of the content provider identifier may be different from that of the content information. Especially, the detection available period of the content provider identifier may be shorter than that of the content information. Through this, the image display device 100 may have an efficient configuration for detecting only necessary information.

Figure 5:
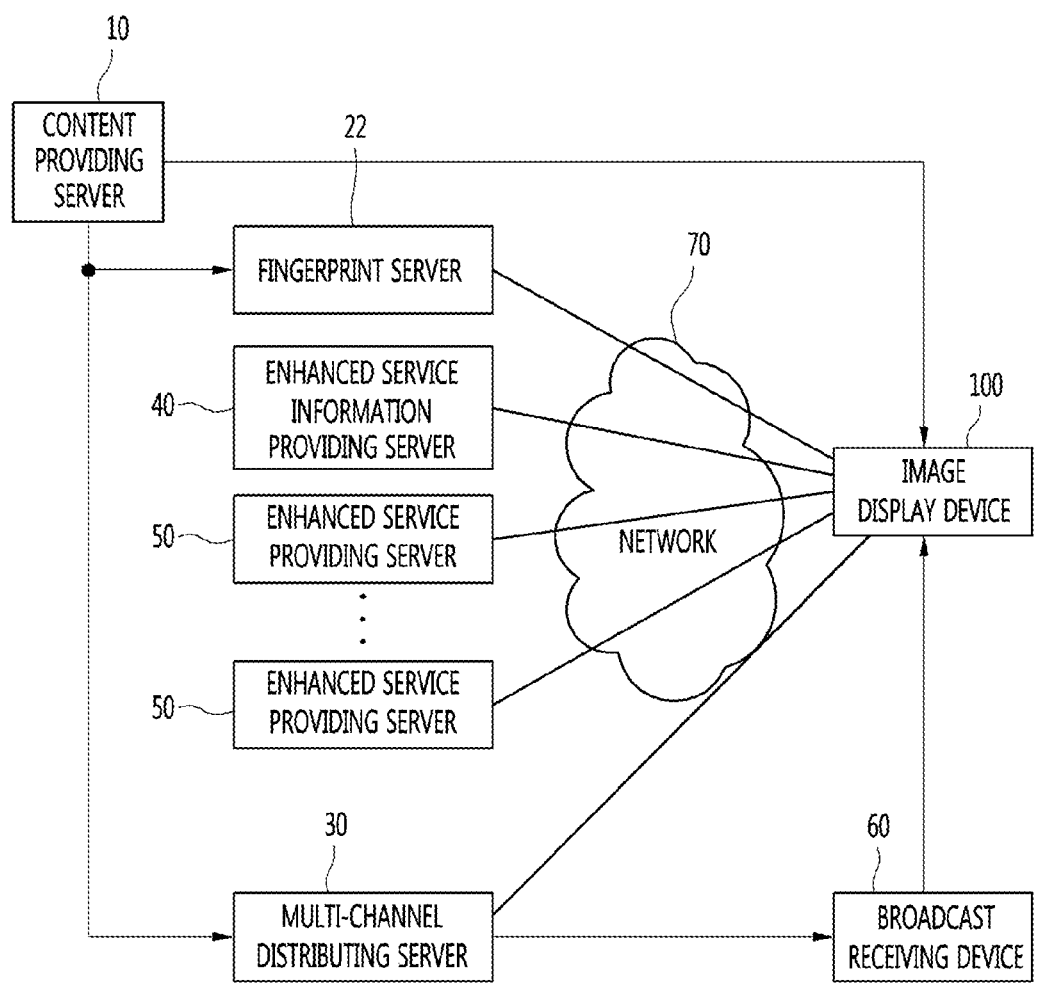
FIG. 5 is a block diagram showing a fingerprint based network topology according to an embodiment of the present invention.

FIG. 5 is a block diagram showing a fingerprint based network topology according to an embodiment of the present invention.

As shown in FIG. 5, according to an embodiment of the present invention, the network topology may further include a fingerprint server 22.

As shown in FIG. 5, the fingerprint server 22 does not modify the main AV content, but extracts feature information from some frames or a section of audio samples of the main AV content and stores toe extracted feature information. Then, when receiving the feature information from the video display device 100, the fingerprint server 22 provides an identifier and time information of an AV content corresponding to the received feature information.

Figure 6:
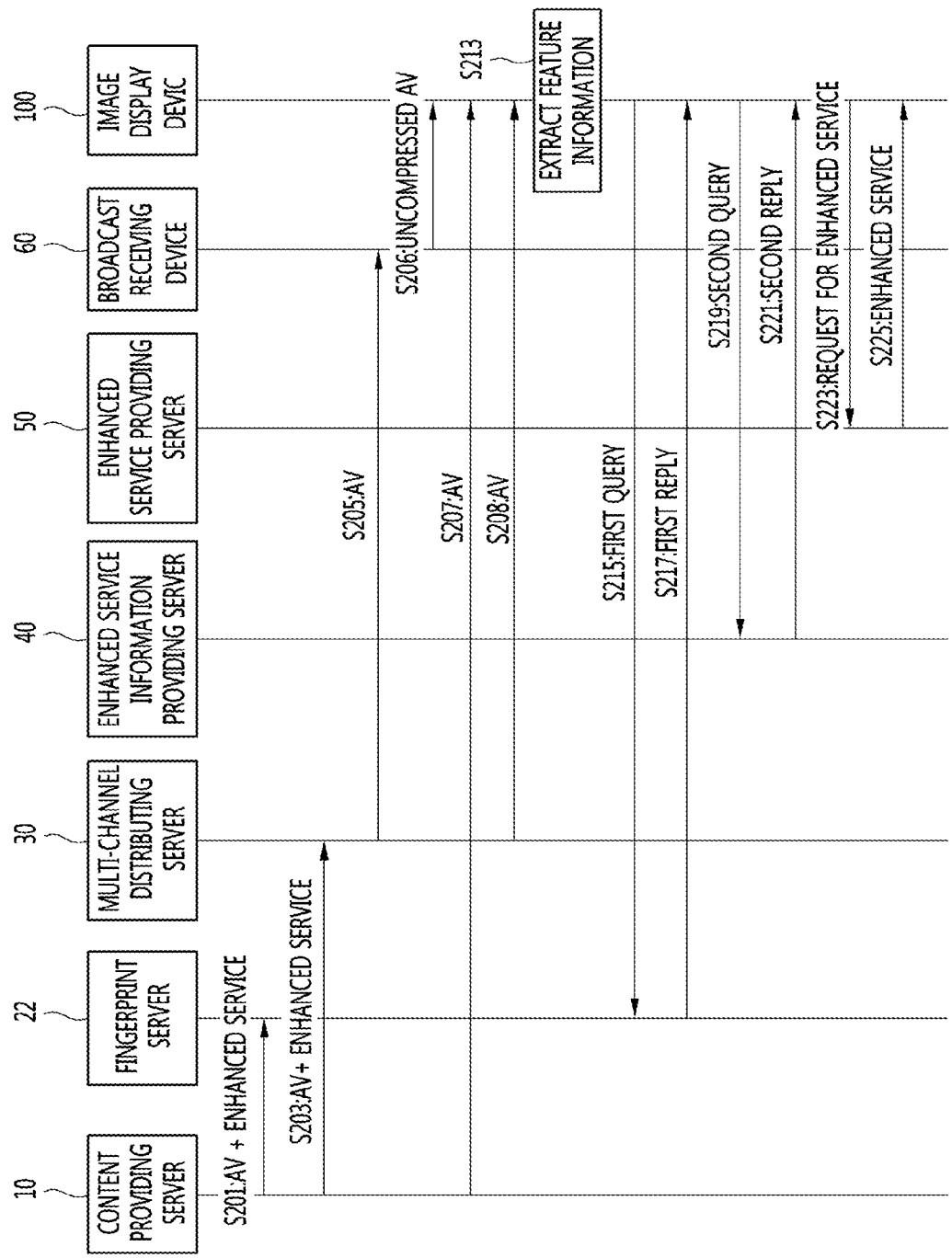
FIG. 6 is a ladder diagram showing a data flow in a fingerprint based network topology according to an embodiment of the present invention.

FIG. 6 is a ladder diagram showing a data flow in a fingerprint based network topology according to an embodiment of the present invention.

First, the content providing server 10 transmits a broadcast signal including the main AV content and an enhanced service (S201).

The fingerprint server 22 receives a broadcast signal that the content providing server 10, extracts a plurality of feature information from a plurality of frame intervals or audio intervals of the main AV content, and establishes a database for a plurality of query results corresponding to the plurality of feature information (S203). The query result may include at least one of content information, enhanced service information, and an available enhanced service.

The MVPD 30 receives broadcast signals including the main AV content and enhanced service and generates a multiplexed signal to provide it to the broadcast receiving device 60 (S205). At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the image display device 100 (S206).

Moreover, the content providing server 10 also broadcasts a broadcast signal including the main AV content through a wireless channel (S207).

Additionally, the MVPD 30 may directly transmit a broadcast signal including the main AV content to the image display device 100 without passing through the broadcast receiving device 60 (S208).

The image display device 100 may receive an uncompressed main AV content through the set-top box 60. Additionally, the image display device 100 may receive a broadcast signal through a wireless channel, and then, may demodulate and decode the received broadcast signal to obtain the main AV content. Additionally, the image display device 100 may receive a broadcast signal from the MVPD 30, and then, may demodulate and decode the received broadcast signal to obtain the main AV content. The image display device 100 extracts feature information from some frames or a section of audio samples of the obtained main AV content (S213).

The image display device 100 accesses the fingerprint server 22 corresponding to the predetermined fingerprint server address to transmit a first query including the extracted feature information (S215).

The fingerprint server 22 provides a query result as a first reply to the first query (S217). If the first reply corresponds to fail, the image display device 100 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described with reference to FIG. 7 and Table 1.

Figure 7:
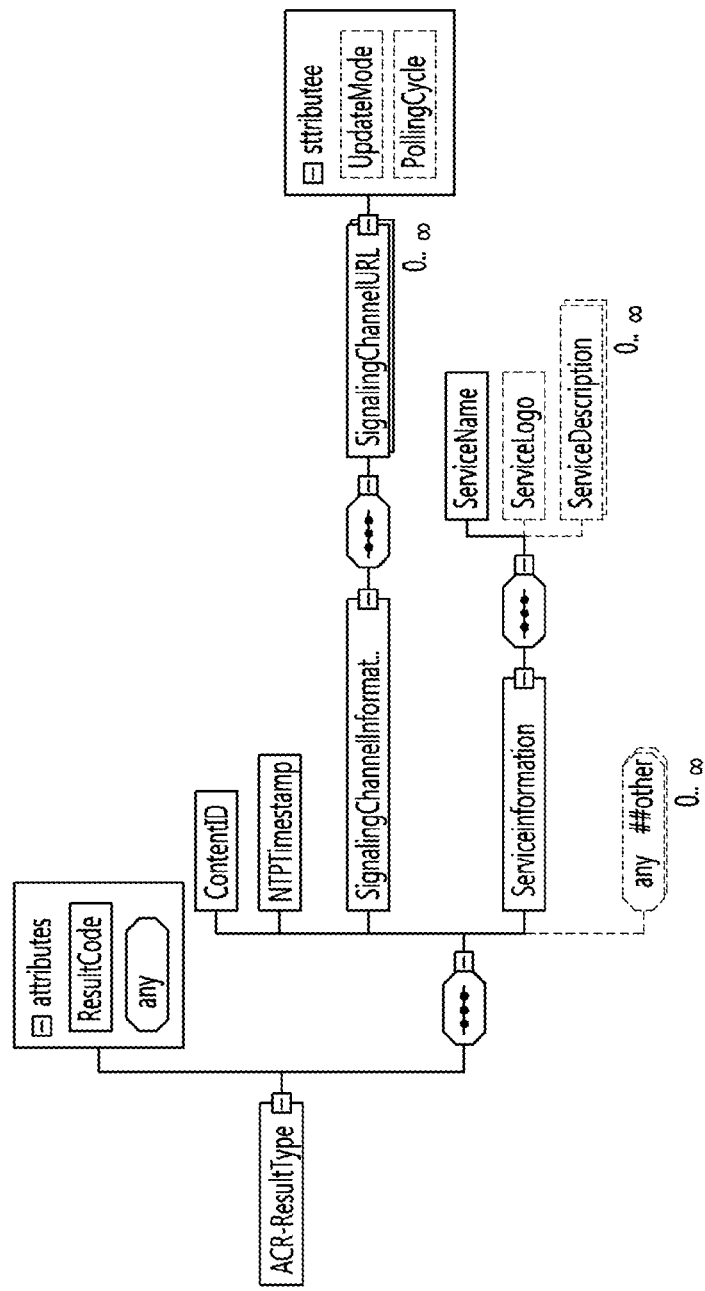
FIG. 7 is a view showing an XML schema diagram of ACR-Result type containing a query result according to an embodiment of the present invention.

FIG. 7 is a view showing an XML schema diagram of ACR-Resulttype containing a query result according to an embodiment of the present invention.

As shown in FIG. 7, ACR-Resulttype containing a query result includes ResuitCode attributes and ContentID, NTP-Timestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 shows an XML schema of ACR-ResultType containing the query result.

TABLE 1

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                        type="xs:unsignedInt"/>
                                </xs:extension>
                            </xs:simpleContent>
                        </xs:complexType>
                    </xs:element>
                </xs:sequence>
            </xs:complexType>
        </xs:element>
```

TABLE 1-continued

```
        <xs:element name="ServiceInformation">
            <xs:complexType>
                <xs:sequence>
                    <xs:element name="ServiceName" type="xs:string"/>
                    <xs:element name="ServiceLogo" type="xs:anyURI"
                        minOccurs="0"/>
                    <xs:element name="ServiceDescription" type="xs:string"
                        minOccurs="0" maxOccurs="unbounded"/>
                </xs:sequence>
            </xs:complexType>
        </xs:element>
        <xs:any namespace="##other" processContents="skip"
            minOccurs="0"
            maxOccurs="unbounded"/>
    </xs:sequence>
    <xs:attribute name="ResultCode" type="xs:string"
        use="required"/>
    <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_indentifier( ) { | | |
| TSID | 16 | uimsbf |
| reserved | 2 | bs1bf |
| end_of_day | 5 | uimsbf |
| unique_for | 9 | uimsbf |
| content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.

urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major >69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:100.200

Moreover, as the ContentID element, an ATSC content identifier may be used as described below.

The ATSC content identifier has the following form.

urn:oma:bcast:iauth:atsc:content:<region>:<xsidz>:
<contentid>:<unique_for>:<end_of_day>

Here, <region> is an international country code including two characters regulated by ISO 639-2. <xsid> for local service is a decimal number of TSID as defined in <region>, and may be followed by "." <serviceid>. <xsid> for (regional service) (major >69) is <serviceid>. <content_id> is a base 64 sign of a content_d field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the image display device 100 accesses the enhanced service information providing server 40 corresponding to the obtained enhanced service address providing server address to transmit a second query including content information (S219).

The enhanced service information providing server 40 searches at least one available enhanced service relating to the content information of the second query. Later, the enhanced service information providing server 40 provides to the image display device 100 enhanced service information for at least one available enhanced service as a second reply to the second query (S221).

If the image display device 100 obtains at least one available enhanced service address through the first reply or the second reply, it accesses the at least one available enhanced service address to request enhanced service (S223), and then, obtains the enhanced service (S225).

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response co the request. In this case, the image display device 100 may transmit the HTTP request according to a Polling period designated as the PollingCycle attribute. Additionally, the SignalingChannelURL element may have an update time attribute. In this case, she image display device 100 may transmit the HTTP request according to an update time designated as the update time attribute.

If the UpdateMode attribute has a Push value, the video display device 100 may receive update from a server asynchronously through XMLHTTPRequest API. After the image display device 100 transmits an asynchronous request to a server through XMLHTTPReouest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 8:
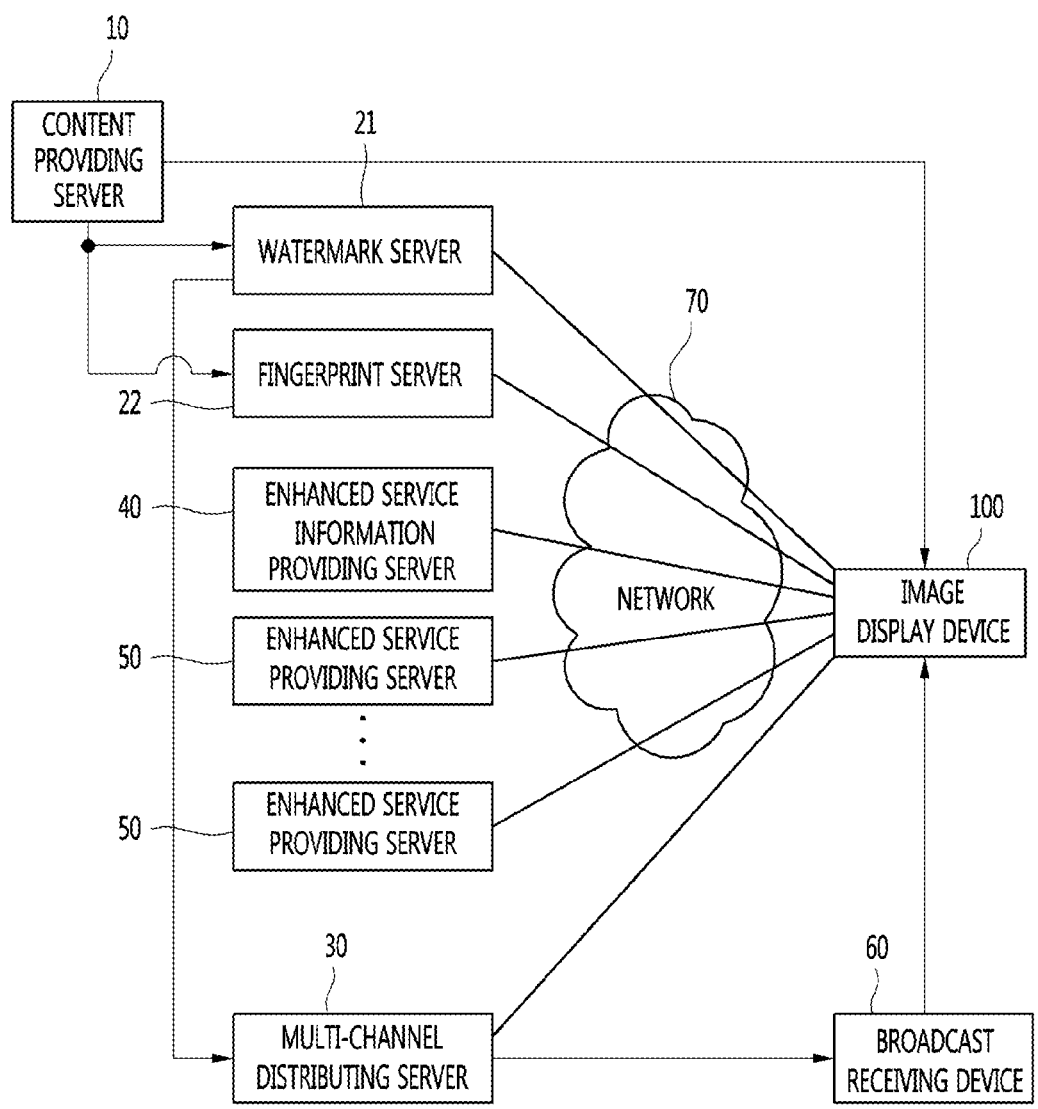
FIG. 8 is a block diagram showing a watermark and fingerprint based network topology according to an embodiment of the present invention.

FIG. 8 is a block diagram showing a watermark and fingerprint based network topology according to an embodiment of the present invention.

As shown in FIG. 8, the watermark and fingerprint based network topology may further include a watermark server 21 and a fingerprint server 22.

As shown in FIG. 8, the watermark server 21 inserts content provider identifying information into the main AV content. The watermark server 21 may insert content provider identifying information as a visible watermark such as a logo or an invisible watermark into the main AV content.

The fingerprint server 22 does not modify the main AV content, but extracts feature information from some frames or a section of audio samples of the main AV content and stores the extracted feature information. Then, when receiving the feature information from the video display device 100, the fingerprint server 22 provides an identifier and time information of an AV content corresponding to the received feature information.

Figure 9:
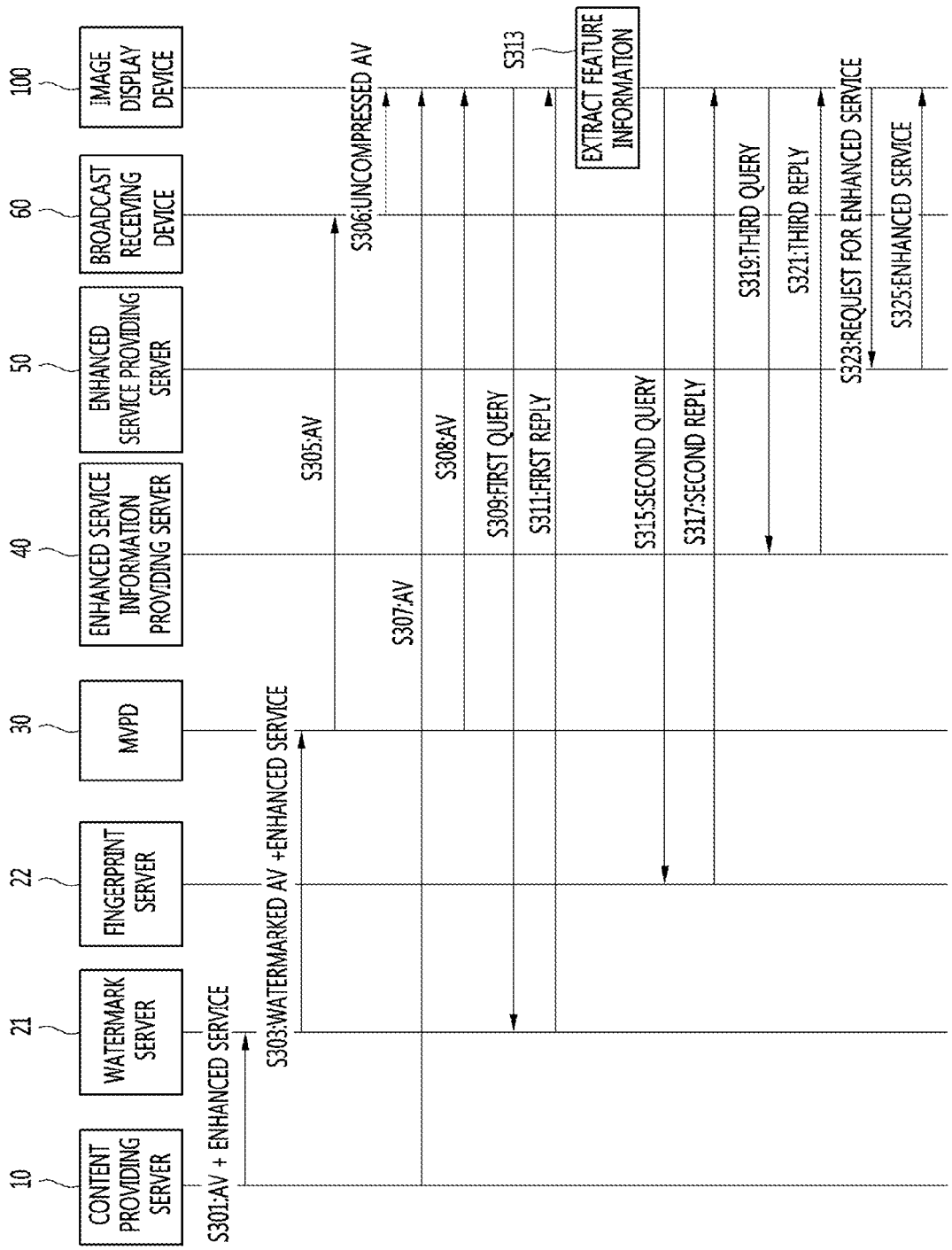
FIG. 9 is a ladder diagram showing a data flow in a watermark and fingerprint based network topology according to an embodiment of the present invention.

FIG. 9 is a ladder diagram showing a data flow in a watermark and fingerprint based network topology according to an embodiment of the present invention.

First, the content providing server 10 transmits a broadcast signal including the main AV content and an enhanced service (S301).

The watermark server 21 receives a broadcast signal that the content providing server 10 provides, inserts a visible watermark such as a logo or watermark information as an invisible watermark into the main AV content by modifying the main AV content, and provides the watermarked main AV content and enhanced service to the MVPD 30 (S303). The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 (S305). At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the image display device 100 (S306).

Moreover, the content providing server 10 also broadcasts a broadcast signal including the main AV content through a wireless channel (S307).

Additionally, the MVPD 30 may directly transmit a broadcast signal including the main AV content to the image display device 100 without going through the broadcast receiving device 60 (S308).

The image display device 100 may receive an uncompressed main AV content through the broadcast receiving device 60. Additionally, the image display device 100 may receive a broadcast signal through a wireless channel, and then, may demodulate and decode the received broadcast signal to obtain the main AV content. Additionally, the image display device 100 may receive a broadcast signal from the MVPD 30, and then, may demodulate and decode the received broadcast signal to obtain the main AV content. The image display device 100 extracts watermark information from some frames or a section of audio samples of the obtained main AV content. If watermark information corresponds to a logo, the image display device 100 confirms a watermark server address corresponding to a logo extracted from a corresponding relationship between a plurality of logos and a plurality of watermark server addresses. When the watermark information corresponds to the logo, the image display device 100 cannot identify the main AV content only with the logo. Additionally, when the watermark information does not include content information, the image display device 100 cannot identify the main AV content but the watermark information may include content provider identifying information or a watermark server address. When the watermark information includes the content provider identifying information, the image display device 100 may confirm a watermark server address corresponding to the content provider identifying information extracted from a corresponding relationship between a plurality of content provider identifying information and a plurality of watermark server addresses. In this manner, when the image display device 100 cannot identify the main AV content the image display device 100 only with the watermark information, it accesses the watermark server 21 corresponding to the obtained watermark server address to transmit a first query (S309).

The watermark server 21 provides a first reply to the first query (S311). The first reply may include at, least one of a fingerprint server address, content information, enhanced service information, and an available enhanced service. The content information and enhanced service information are described above.

If the watermark information and the first reply include a fingerprint server address, the image display device 100 extracts feature information from some frames or a section of audio samples of the obtained main AV content (S313).

The image display device 100 accesses the fingerprint server 22 corresponding to the fingerprint server address in the first reply to transmit a second query including the extracted feature information (S315).

The fingerprint server 22 provides a query result as a second reply to the second query (S317).

If the query result does not include an enhanced service address or enhanced service but includes an enhanced service address providing server address, the image display device 100 accesses the enhanced service information providing server 40 corresponding to the obtained enhanced service address providing server address to transmit a third query including content information (S319).

The enhanced service information providing server 40 searches at least one available enhanced service relating to the content information of the third query. Thereafter, the enhanced service information providing server 40 provides to the image display device 100 enhanced service information for at least one available enhanced service as a third reply to the third query (S321).

If the image display device 100 obtains at least one available enhanced service address through the first reply, the second reply, or the third reply, it accesses the at least one available enhanced service address to request enhanced service (S323), and then, obtains the enhanced service (S323).

Then, referring to FIG. 10, the image display device 100 will be described according to an embodiment of the present invention.

Figure 10:
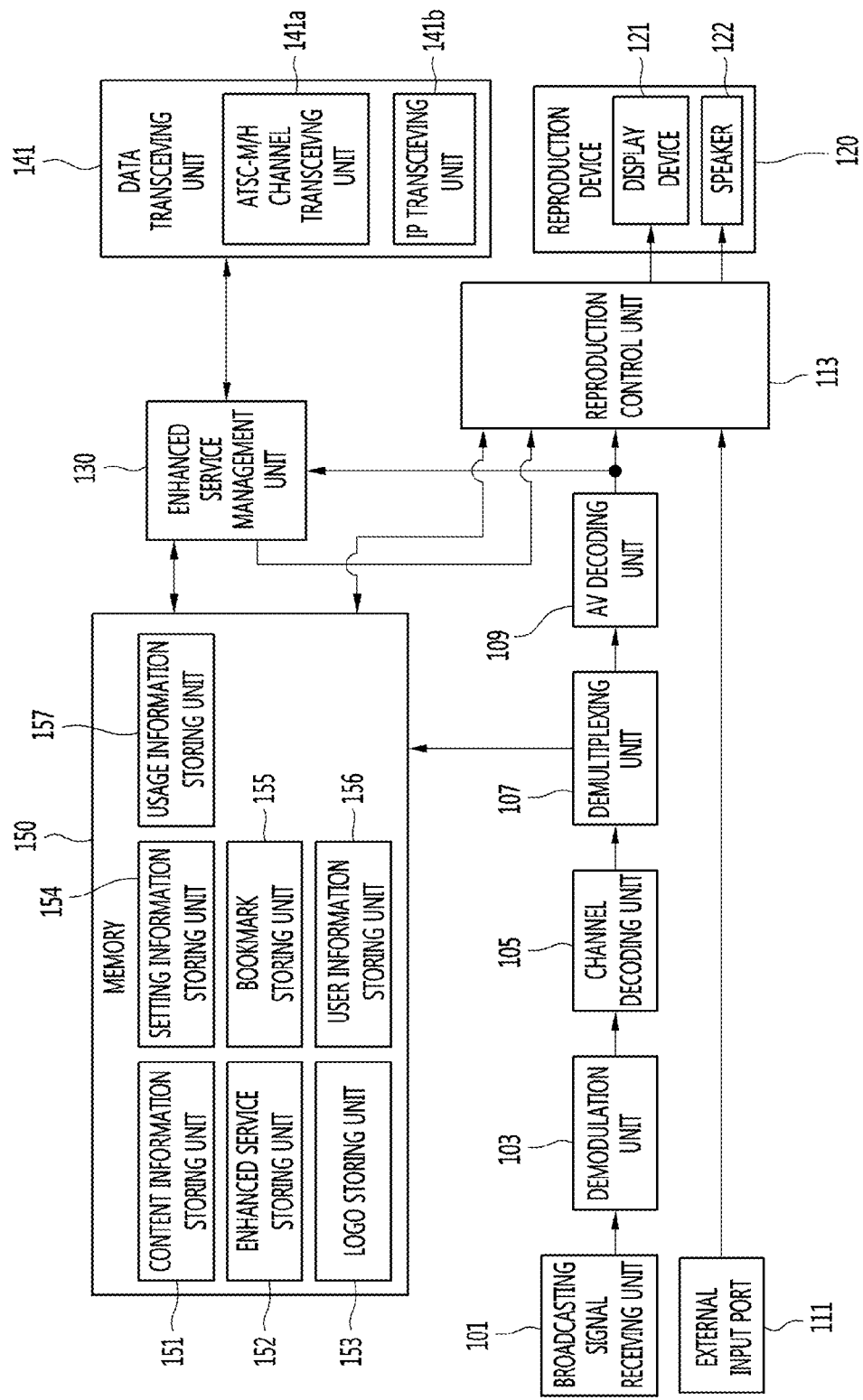
FIG. 10 is a block diagram showing a video display device according to the embodiment of the present invention.

FIG. 10 is a block diagram showing the video display device according to the embodiment of the present invention.

As shown in FIG. 10, according to an embodiment of the present invention, the image display device 100 includes a broadcast signal receiving unit 101, a demodulation unit 103, a channel decoding unit 105, a demultiplexing unit 107, an AV decoding unit 109, an external input port 111, a reproduction controlling unit 113, a reproduction device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates the main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia interface (HDMI) port, a Digital Visual interface (DVI) port, a composite port, a component port, and an S-Video port.

The reproduction controlling unit 113 controls the reproduction device 120 to reproduce at least one of an uncompressed main AV content that the AV decoding unit 109 generates and an uncompressed main AV content received from the external input port 111 according to a user's selection.

The reproduction device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main AV content and obtains available enhanced service on the basis of the obtained content information. Especially, as described above, the enhanced service management unit 130 may obtain the identification information of the main AV content on the basis of some frames or a section of audio samples of the uncompressed main AV content. This is called automatic contents recognition (ACR) in this specification.

The data transmitting/receiving unit 141 may include an Advanced Television Systems Committee-Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The image display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of feature information.

The enhanced service storage unit 152 may store a plurality of enhanced services corresponding to a plurality of feature information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once she usage information range is set, the image display device 100 collects and reports main AV content watching information and enhances service usage information within the set range. The usage information range may be set in each virtual channel. Additionally, the usage information measurement allowable range may be set over an entire physical channel.

The usage information providing unit 157 stores the main AV content watching information and the enhanced service usage information which are collected by the video display device 100. Additionally, the image display device 100 analyzes a service usage pattern on the basis of the collected main AV content watching information and enhanced service usage information, and stores the analyzed service usage pattern in the usage information storage unit 157.

The enhanced service management unit 130 may obtain the content information of the main AV content from the fingerprint server 22 or the content information storage unit 151. If there is no content information or sufficient content information, which corresponds to the extracted feature information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Figure 11:
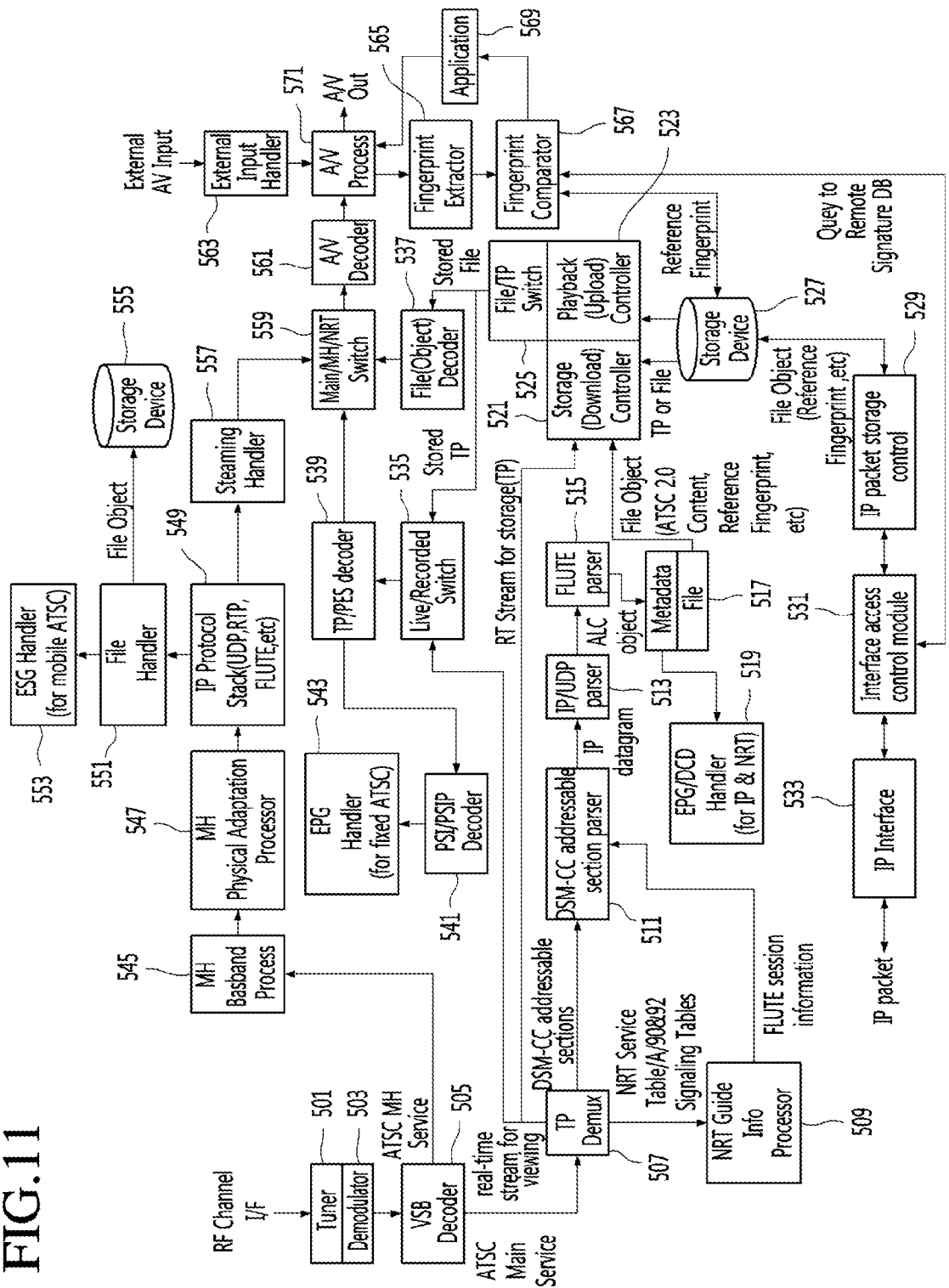
FIG. 11 is a block diagram showing the structure of a fingerprint based image display device according to another embodiment of the present invention.

FIG. 11 is a block diagram owing the structure of a fingerprint based image display device according to another embodiment of the present invention.

As shown in FIG. 11, a tuner 501 extracts a symbol from an 8-VSB RF signal transmitted through an air channel.

An 8-VSB demodulator 503 demodulates the 8-VSB RF signal extracted by the tuner 501 and recoveries meaningful digital data.

A VSB decoder 505 decodes the digital data recovered by the 8-VSB demodulator 503 to recover an ATSC main service and an ATSC M/H service.

An MPEG-2 TP Demux 507 filters a transport packet, which is selected from an MPEG-2 transport packet transmitted through the 8-VSB signal or an MPEG-2 transport packet stored in a PVR storage and is to be processed by the image display device 100, and relays the transport packet to an proper processing module.

A PES decoder 539 buffers and recovers a packetized elementary stream transmitted through an MPEG-2 transport stream.

A PSI/PSIP decoder 541 buffers and analyzes PSI/PSIP section data transmitted through an MPEG-2 Transport Stream. The analyzed PSI/PSIP data are collected by a Service Manager (not shown), and then, is stored in DB in a form of service map and guide data.

A DSMCC section buffer/handler 511 buffers and processes DSMCC section data for file transmission through MPEG-2 TP and IP Datagram encapsulation.

An IP/UDP datagram buffer/header parser 513 buffers and restores IP Datagram, which is encapsulated through DSMCC addressable section and transmitted through MPEG-2 TP, to analyze the header of each datagram. In addition, an IP/UDP datagram buffer/header parser 513 buffers and restores UDP datagram transmitted through IP datagram, and then analyzes and processes the restored UDP header.

A Stream component handler 557 may include an ES buffer/handler, a PCR handler, an STC module, a descrambler, a CA stream buffer/handler, and a service signaling section buffer/handler.

The ES buffer/handler buffers and restores an elementary stream, such as video and audio data, transmitted in a PES form to transmit the elementary stream to a proper A/V decoder.

The PCR handler processes program clock reference (PCR) data used for time synchronization of audio and video stream.

The STC module corrects clock values of the A/V decoders by using a reference clock value received through PCR handler to perform time synchronization.

When scrambling is applied to the payload of the received IP datagram, the descrambler restores data of the payload by using an encryption key delivered from the CA stream handler.

The CA stream buffer/handler buffers and processes data such as key values for descrambling of EMM and ECM, which are transmitted for a conditional access function through MPEG-2 TS or IP Stream. An output of the CA stream buffer/handler is delivered to the descrambler, and then, the descrambler descrambles MPEG-2 TP or IP datagram, which carriers A/V data and file data.

The service signaling section buffer/handler buffers, restores, and analyzes NRT service signaling channel section data transmitted in a form of IP datagram. The service manager (not shown) collects the analyzed NRT service signaling channel section data and stores them in DB in a form of service map and guide data.

The A/V decoder 561 decodes the uncompressed audio/video data received through an ES Handler to present the audio/video data to a user.

An MPEG-2 service Demux (not shown) may include an MPEG-2 TP buffer/parser, a descrambler, and a PVR storage module.

An MPEG-2 TP buffer/parser (not shown) buffers and restores an MPEG-2 transport packet transmitted through an 8-VSB signal, and also detects and processes a transport packet header.

The descrambler restores payload data by using an encryption key, which is delivered from the CA stream handler, on the scramble applied packet payload in the MPEG-2 TP.

The PVR storage module stores an MPEG-2 TP received through an 8-VSB signal according to the user's request and outputs an MPEG-2 TP by the user's request. The PVR storage module may be controlled by the PVR manager (not shown).

The file handler 551 may include an ALC/LCT buffer/parser, an FDT handler, an XML parser, a file reconstruction buffer, a decompressor, a file decoder, and a file storage.

The ALC/LCT buffer/parser buffers and restores ALC/LCT data transmitted through a UDP/IP Stream, and analyzes a header and header extension of ALC/LCT. The ALC/LCT buffer/parser may be controlled by an NRT service manager (not shown).

The FDT handler analyzes and processes a file description table of an FLUTE protocol transmitted through an ALC/LCT session. The FDT Handler may be controlled by the NRT service manager (not shown).

The XML parser analyzes an XML document transmitted through an ALC/LCT session, and then, delivers the analyzed data to a proper module such as an FDT Handler and an SG Handler.

The file reconstruction buffer restores a file transmitted through an ALC/LCT, FLUTE session.

If a file transmitted through an ALC/LCT and FLUTE session is compressed, the decompressor performs a process to decompress the file.

The file decoder decodes a file restored in the file reconstruction buffer, a file decompressed in the decompressor, or a film extracted from the file storage.

A file storage stores or extracts a restored file if necessary.

An M/W engine (not shown) processes data such as a file, which is not an A/V stream transmitted through DSMCC section and IP datagram. The M/W engine delivers the processed data to a presentation manager module.

The SG Handler (not shown) collects and analyzes service guide data transmitted in an XML Document form, and then, delivers them to the EPG manager.

The service manager (not shown) collects and analyzes PSI/PSIP data transmitted through an MPEG-2 transport stream and service signaling section data transmitted through an IP stream, so as to produce a service map. The service manager (not shown) stores the produced service map in a service map & guide database, and controls an access to a service that a user wants. The service manager is controlled by an operation controller (not shown), and controls the tuner 501, the MPEG-2 TP Demux 507, and the IP datagram buffer/handler 513.

The NRT service manager (not shown) performs an overall management on the NRT service transmitted in an object/file form through a FLUTE session on an IP layer. The NRT service manager (not shown) may control the FDT handler and file storage.

An application manager (not shown) performs overall management on application data transmitted in a form of object and file.

An UI Manager (not shown) delivers a user input to the operation controller through a user interface, and starts a process for a service that a user requests The operation controller (not shown) processes a command of a user, which is received through a UI Manager, and allows a Manager of a necessary module to perform a corresponding action.

A fingerprint extractor 565 extracts fingerprint feature information from an AV stream.

A fingerprint comparator 567 compares the feature information extracted by the fingerprint extractor with a reference fingerprint to find matched content. The fingerprint comparator 567 may use a reference fingerprint DB stored in local and may query a fingerprint query server on the Internet to receive a result. The matched result data obtained based on a comparison result may be delivered to an application and used.

An application 569 is an application module which performs an ACR function or provides an enhanced service based on ACR. The application 569 identifies a broadcast content in viewing and provides an enhanced service associated with the content.

Figure 12:
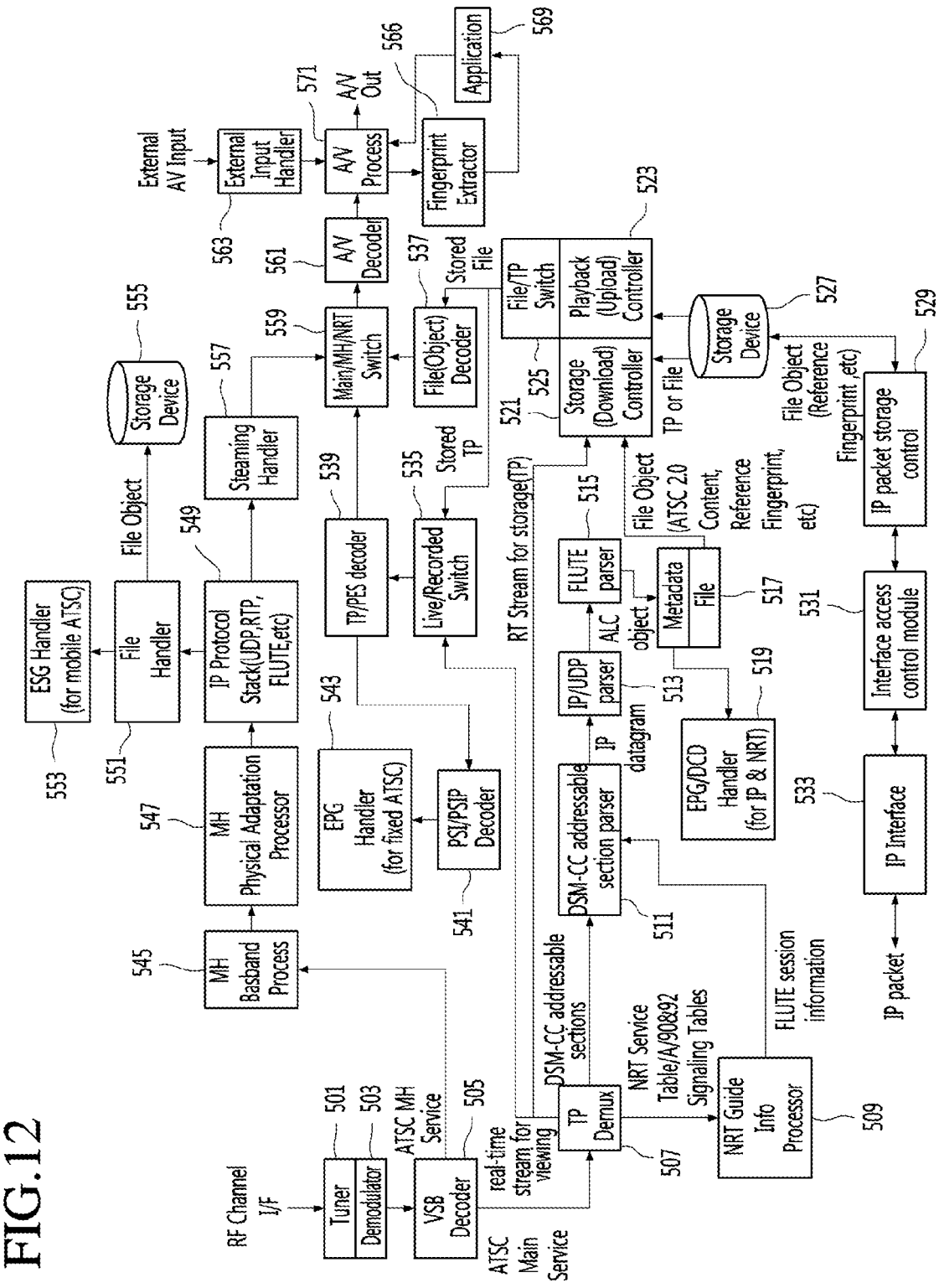
FIG. 12 is a block diagram showing the structure of a watermark based image display device according to another embodiment of the present invention.

FIG. 12 is a block diagram showing the structure of a watermark-based image display device, according to another embodiment of the present invention.

Although the watermark-based image display device shown in FIG. 12 is similar to the fingerprint-based image display device shown in FIG. 11, the watermark-based image display device does not include a fingerprint extractor 565 and a fingerprint comparator 567 of the fingerprint-based image display device.

A watermark extractor 566 extracts data inserted in a watermark form from an Audio/Video stream. The extracted data may be delivered to an application and may be used.

Figure 13:
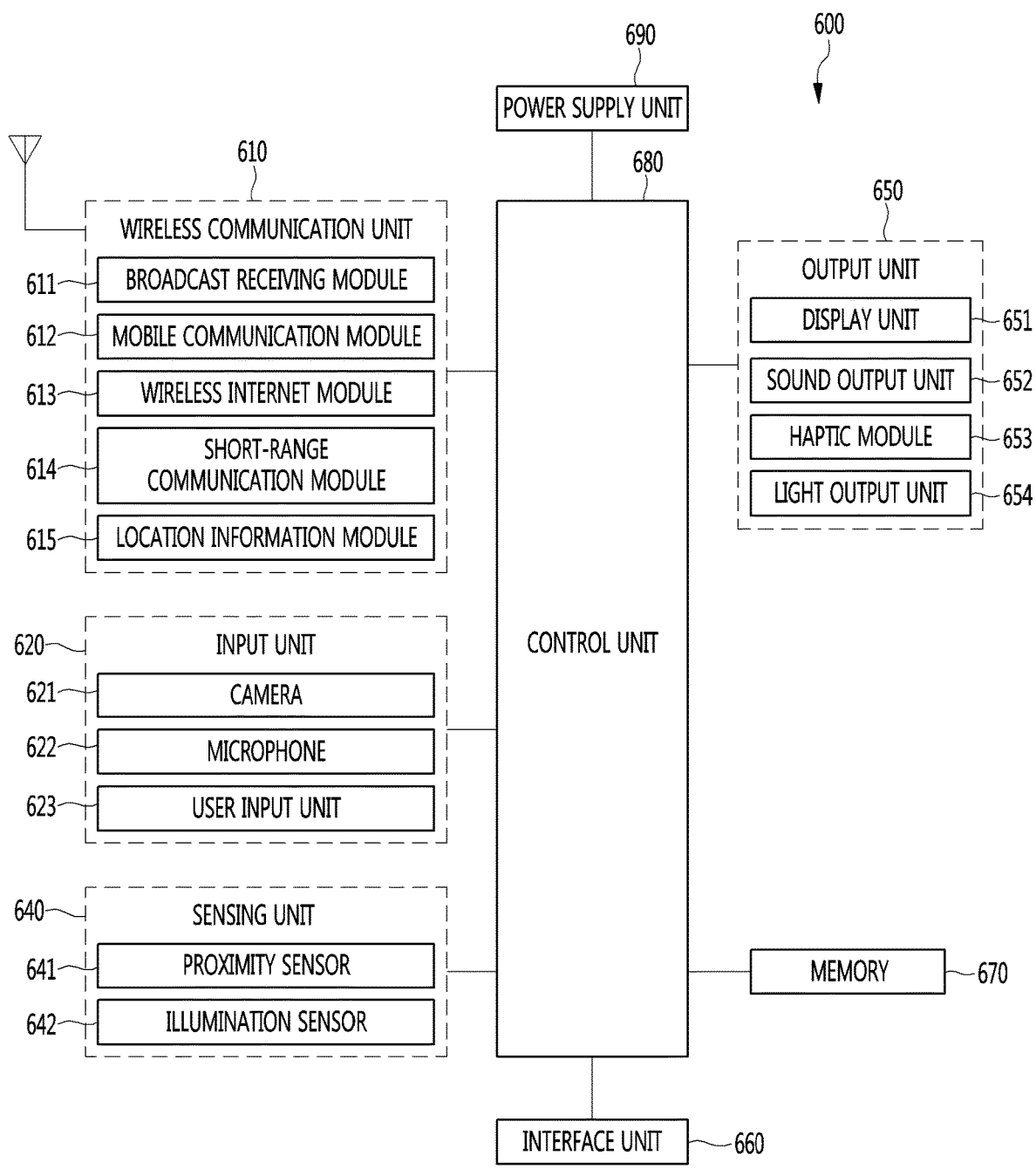
FIG. 13 is a block diagram showing a mobile terminal according to the present disclosure.

FIG. 13 is a block diagram showing a mobile terminal in accordance with the present disclosure.

The mobile terminal 600 is shown having components such as a wireless communication unit 610, an input unit 620, a sensing unit 640, an output unit 650, an interface unit 660, a memory 670, a controller 680, and a power supply unit 690. It is understood that implementing all of the shown components is not a requirement, and that greater or fewer components may alternatively be implemented.

The wireless communication unit 610 typically includes one or more modules which permit communications such as wireless communications between the mobile terminal 600 and a wireless communication system, communications between the mobile terminal 600 and another mobile terminal, communications between the mobile terminal 600 and an external server. Further, the wireless communication unit 610 typically includes one or more modules which connect the mobile terminal 600 to one or more networks.

To facilitate such communications, the wireless communication unit 610 includes one or more of a broadcast receiving module 611, a mobile communication module 612, a wireless Internet module 613, a short-range communication module 614, and a location information module 615.

The input unit 620 includes a camera 621 for obtaining images or video, a microphone 622, which is one type of audio input device for inputting an audio signal, and a user input unit 623 (for example, a touch key, a push key, a mechanical key, a soft key, and the like) for allowing a user to input information. Data (for example, audio, video, image, and the like) is obtained by the input unit 620 and may be analyzed and processed by controller 680 according to device parameters, user commands, and combinations thereof. The sensing unit 640 is typically implemented using one or more sensors configured to sense internal information of the mobile terminal, the surrounding environment of the mobile terminal, user information, and the like. For example, in FIG. 13, the sensing unit 640 is shown having a proximity sensor 641 and an illumination sensor 642.

If desired, the sensing unit 640 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 621), a microphone 622, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 600 may be configured to utilize information obtained from sensing unit 640, and in particular, information obtained from one or more sensors of the sensing unit 640, and combinations thereof.

The output unit 650 is typically configured to output various types of information, such as audio, video, tactile output, and the like. The output unit 650 is shown having a display unit 651, an audio output module 652, a haptic module 653, and an optical output module 654.

The display unit 651 may have an inter-layered structure or an integrated structure with a touch sensor in order to facilitate a touch screen. The touch screen may provide an output interface between the mobile terminal 600 and a user, as well as function as the user input unit 623 which provides an input interface between the mobile terminal 600 and the user.

The interface unit 660 serves as an interface with various types of external devices that can be coupled to the mobile terminal 600. The interface unit 660, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 600 may perform assorted control functions associated with a connected external device, in response to the external device being connected to the interface unit 660.

The memory 670 is typically implemented to store data to support various functions or features of the mobile terminal 600. For instance, the memory 670 may be configured to store application programs executed in the mobile terminal 600, data or instructions for operations of the mobile terminal 600, and the like. Some of these application programs may be downloaded from an external server via wireless communication. Other application programs may be installed within the mobile terminal 600 at time of manufacturing or shipping, which is typically the case for basic functions of the mobile terminal 600 (for example, receiving a call, placing a call, receiving a message, sending a message, and the like). It is common for application programs to be stored in the memory 670, installed in the mobile terminal 600, and executed by the controller 680 to perform an operation (or function) for the mobile terminal 600.

The controller 680 typically functions to control overall operation of the mobile terminal 600, in addition to the operations associated with the application programs. The controller 680 may provide or process information or functions appropriate for a user by processing signals, data, information and the like, which are input or output by the various components depicted in FIG. 13, or activating application programs stored in the memory 670. As one example, the controller 680 controls some or all of the components shown in FIG. 13 according to the execution of an application program that have been stored in the memory 670.

The power supply unit 690 can be configured to receive external power or provide internal power in order to supply appropriate power required for operating elements and components included in the mobile terminal 600. The power supply unit 690 may include a battery, and the battery may be configured to be embedded in the terminal body, or configured to be detachable from the terminal body.

At least a portion of each element may operate through the interworking with a portion of a portion of another element to realize the operation, the control, or the control method of a mobile terminal according to various embodiments described below. In addition, the operation, the control, and the control method of the mobile terminal may be realized on the mobile terminal as at least one application program stored in the memory 670 operates.

Hereinafter, a method of controlling an enhanced service acquired by utilizing the above-described ACR function through the electronic device will be described.

Figure 14:
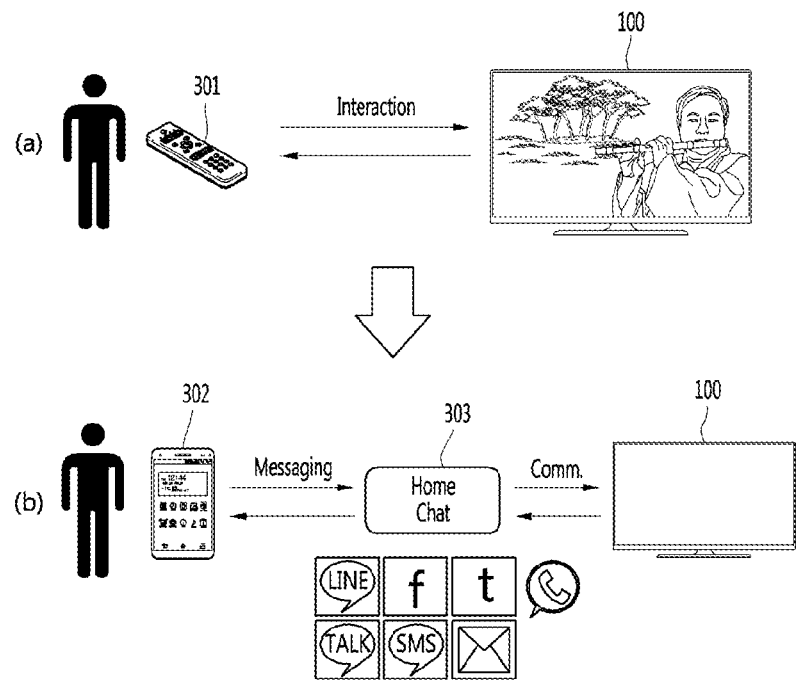
FIG. 14 schematically shows a method of controlling a service provided for a user by utilizing a conventional ACR function (a) and a method of controlling an enhanced service provided through an application of an electronic device according to an embodiment of the present invention (b).

FIG. 14 shows a method of controlling service provided for a user by utilizing a conventional ACR function (a) and schematically shows a method of controlling the enhanced service provided through the application 303 of the electronic device 302 according to one embodiment of the present invention.

As shown in FIG. 14(a), conventionally, the image display device 100 recognizes content which is currently broadcasting and displays the recognized content and the enhanced service associated with the content on a screen. In addition, the user controls the enhanced service displayed on the image display device through the remote controller 301.

However, according to a conventional method, since the enhanced service is provided through the remote controller 301 which is unfamiliar with the user, it is difficult for the user to control the enhanced service. Generally, the control of the image display device 100 through the image controller 301 is performed by merely pressing a button, but has a difficulty in controlling a pointer displayed on the image display device through the remote controller 301 to control the enhanced service.

In addition, according to the conventional method, the enhanced service, which is acquired, is displayed together with the present content, so that it is difficult for a user to view the present content. If necessary, even though the user does not want to display the enhanced service, the enhanced service has to be displayed due to the reasons such as advertisement contract. Accordingly, the user may feel inconvenient when viewing content due to the displayed enhanced service.

Therefore, according to the method of controlling the enhanced service of the present invention (see FIG. 14(b)), when the image display device 100 acquires the enhanced service based on the ACR function, the relevant enhanced service is displayed on the electronic device 302 instead of the image display device 100. The enhanced service, which is displayed on the electronic device 302, may be controlled through the application 303 which is previously installed in the electronic device 302. For example, the electronic device 302 may include, for example, a smart phone, a tablet PC, a wearable device, or the like. For example, the previously-installed application 303 may include a messenger application, a mail application, or a social network service application.

According to the method of controlling the enhanced service of the present invention, the acquired enhanced service may be controlled through the electronic device 302 which is relatively familiar with the remote controller 301, so that the use convenience may be improved.

In addition, the acquired enhanced service is not displayed on the image display device 100 together with the present content, but displayed on the electronic device 302 so that the enhanced service may not interrupt the user from viewing the present content.

Figure 15:
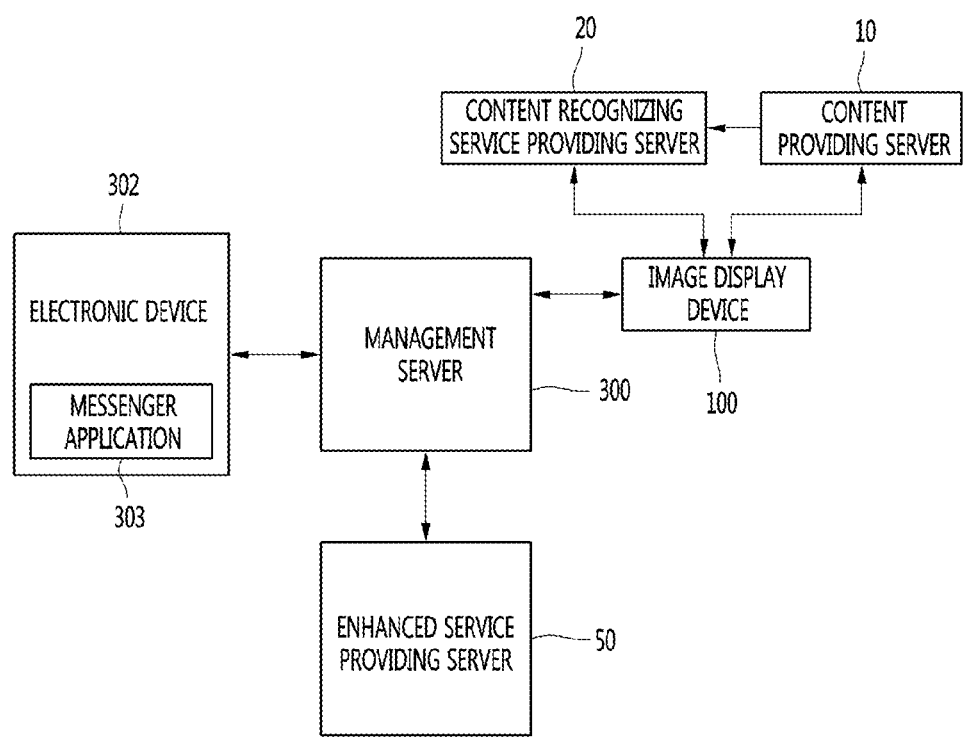
FIG. 15 is a block diagram showing the whole configuration of controlling an enhanced service through an electronic device described above.

FIG. 15 is a block diagram showing the whole configuration for controlling the enhanced service through the above-described electronic device.

According to an embodiment of the present invention, an enhanced service control system includes a content providing server 10, a content recognizing service providing server 20, an enhanced service providing server 50, an image display device 100, a management server 300, and an electronic device 302. Among them, the content providing server 10, the content recognizing service providing server 20, and the enhanced service providing server 50 have been described above, and the details thereof will be omitted.

The electronic device 302 controls enhanced service through the previously installed application 303. Although FIG. 15 shows a messenger application as one example of the application, another application for controlling the enhanced service is possible as described above. The electronic device 302 displays the enhanced service acquired through the application 303 and receives an input to control the enhanced service. For example, a character input may be received from a user. Alternatively, a voice input may be received from the user.

According to an embodiment, the management server 300 connects the application 303 of the electronic device 302 with the image display device 100. According to another embodiment, the application 303 of the electronic device 302 is connected with another home appliance other than the image display device 100.

In detail, the management server 300 acquires the enhanced service through content information recognized from the image display device 100 and transmits the content information to the electronic device 302. In addition, a control command for the enhanced service is received from the electronic device 302 and the control command is converted into a control signal of the image display device 100 and other home appliances.

Although FIG. 15 shows the image display device 100 as one example of a device controlled by the management server 300, another home appliance may be controlled other than the image display device 100. The another home appliance may include a refrigerator, washing machine, an air conditioner, an oven, a robot cleaner, or the like.

The above home appliances may be connected with the management server 300 through a repeater at home, and the connected home appliance may be controlled through the messenger application 303 of the electronic device 302. In addition, a plurality of home appliances may be connected with each other, and the user may control the home appliances once through the application 303.

Hereinafter, the control of a typical home appliance through the application 303 will be described with reference to FIGS. 16 to 32. Hereinafter, a messenger among applications installed in the electronic device 302 will be representatively described.

Figure 16:
FIG. 16 is a view showing a basic screen of a home appliance control service based on a messenger.

FIG. 16 is a view showing a basic screen of a home appliance control service through a messenger. As shown in FIG. 16, the electronic device 302 displays a plurality of commands to control the home appliance through a chat window of the messenger 303. The user may control the home appliance by inputting a command in '[ ]' into a chat window.

Figure 17:
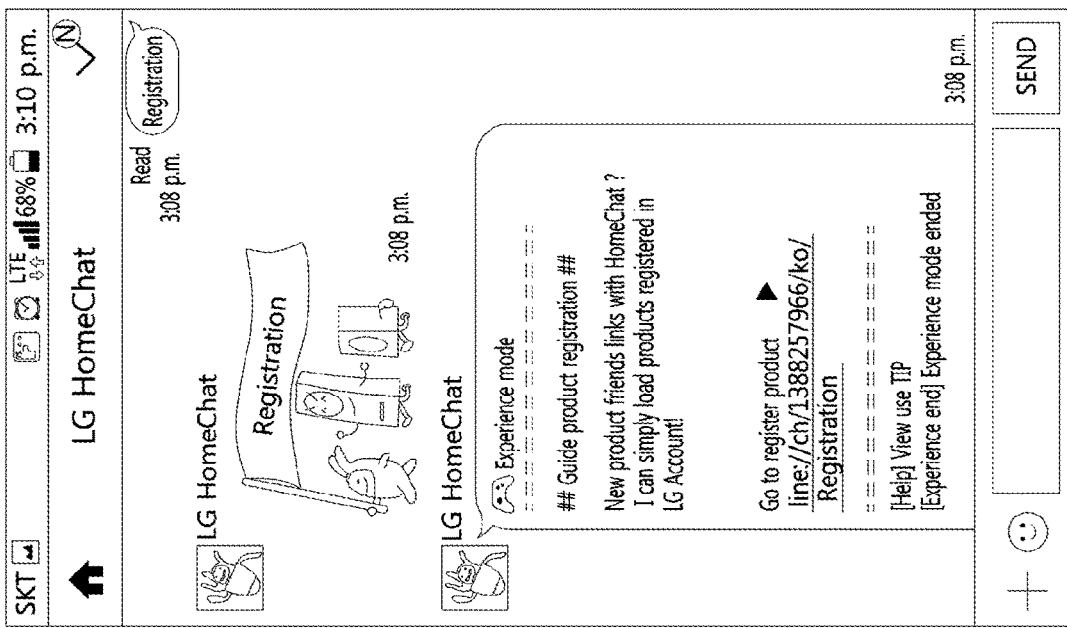
FIG. 17 is a view showing a menu for registering a home appliance through a messenger.

FIG. 17 is a view showing a menu for registering a home appliance through the messenger 303. As shown in FIG. 17, if a user inputs a word of "registration" into the chat window in the basic screen state of FIG. 16, the messenger 303 displays an Internet address for the registration of a produce. The user may touch the displayed Internet address, may access a site, and may register a home appliance to be controlled through the electronic device 302 in the accessed site. The registered home appliance may be connected through the messenger 303. The user may input the command into the chat window and may control the operation of the connected home appliance.

Figure 18:
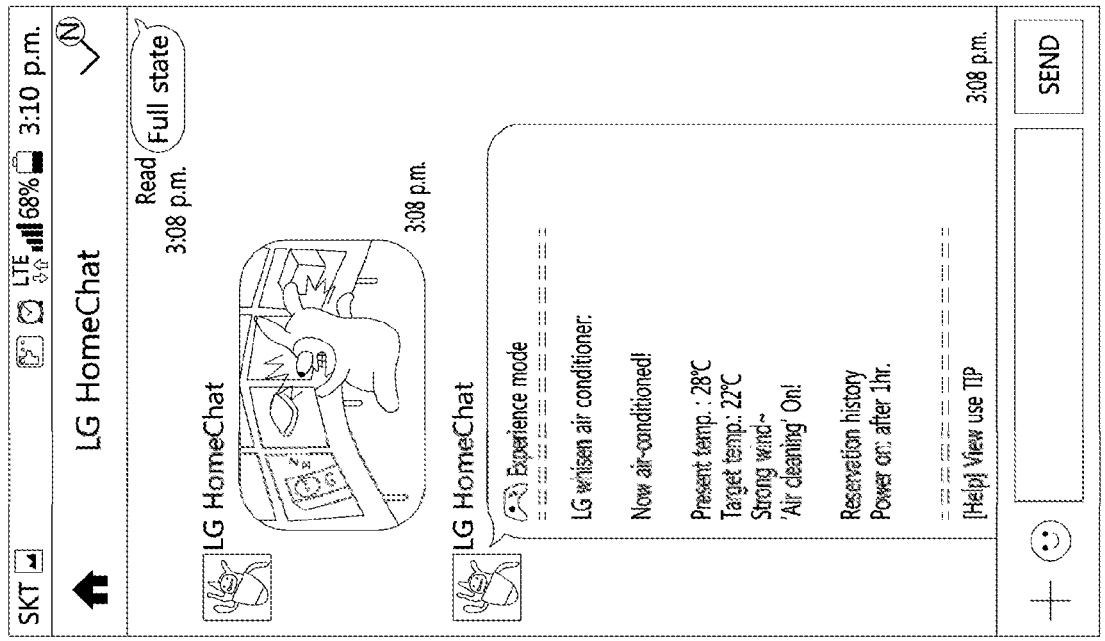
FIGS. 18 to 19 illustrate menus for notifying a present state of home appliances registered through the registration men.
Figure 19:
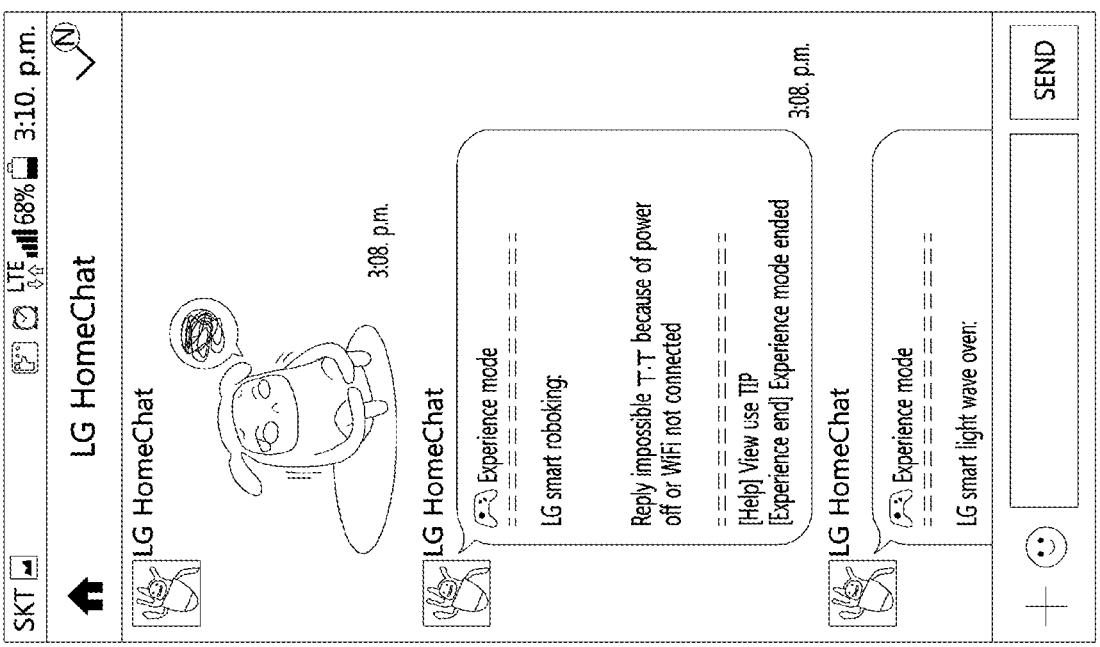

FIGS. 18 to 19 are views showing menus for notifying the present states of the home appliances registered through the registration menu. As shown in FIG. 8, if the user inputs the words of 'whole state' into the chat window in the basic screen state of FIG. 16, the messenger 303 may display the present state of the registered home appliances. According to an embodiment, as shown in FIG. 18, when the air-conditioner is registered, the electronic device 302 may display a present operating state and a reservation history through the chat window of the messenger 303.

According to another embodiment, as shown in FIG. 19, the electronic device 302 may display, on the chat window of the messenger 303, the content that there is no response for any reason although a robot cleaner is registered. In this case, the robot cleaner is in a state that he robot cleaner is not controlled through the messenger due to the disconnection from the server 300. Accordingly, the user checks the state of the robot cleaner and powers on the robot cleaner or activates a Wi-Fi function to connect the robot cleaner with the management server 300 such that the relevant robot cleaner may be controlled through the messenger 303.

Figure 20:
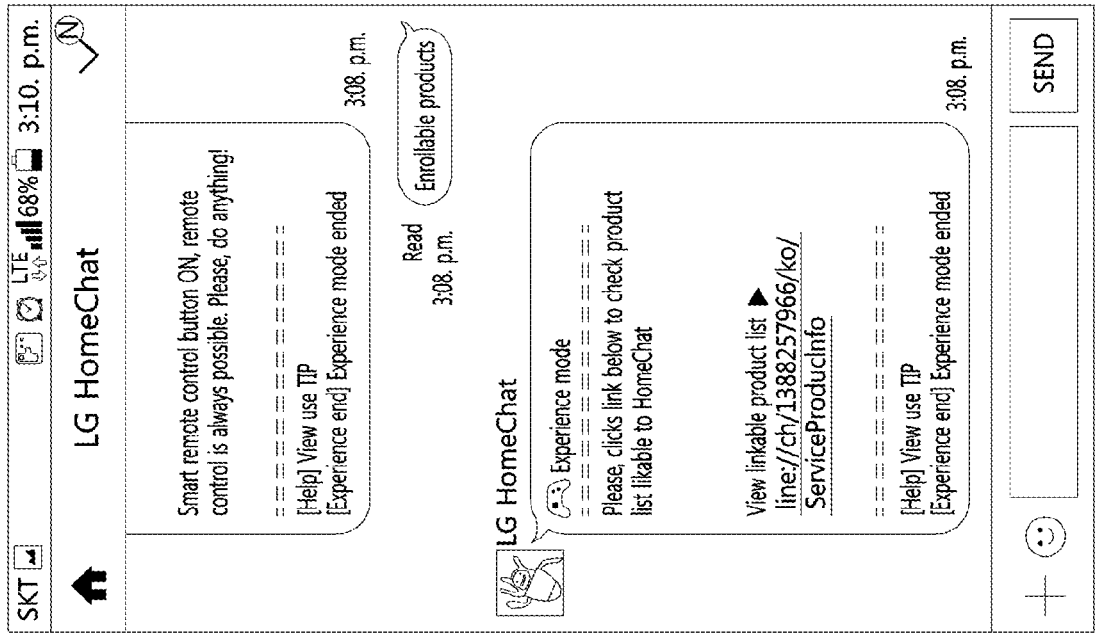
FIG. 20 is a view showing a menu for notifying a product that is able to be currently registered.

FIG. 20 is a view showing a menu for notifying a product that is currently enrollable. As shown in FIG. 20, if the user inputs the words of 'enrollable product' into the chat window in the basic screen state of FIG. 16, the messenger 303 displays an Internet address, in which the list of products currently enrollable may be determined, on the chat window. The user may touch and access the relevant Internet address and may determine the list of products that is connectable from the access site.

Home appliances mostly have mutually different purchase years. Even if the home appliances have the same purchase year, there may be a model that does not support the remote control through a model device. Accordingly, the user may access the relevant site and may determine whether the home appliance currently held is a model that supports the remote control through the mobile device.

Figure 21:
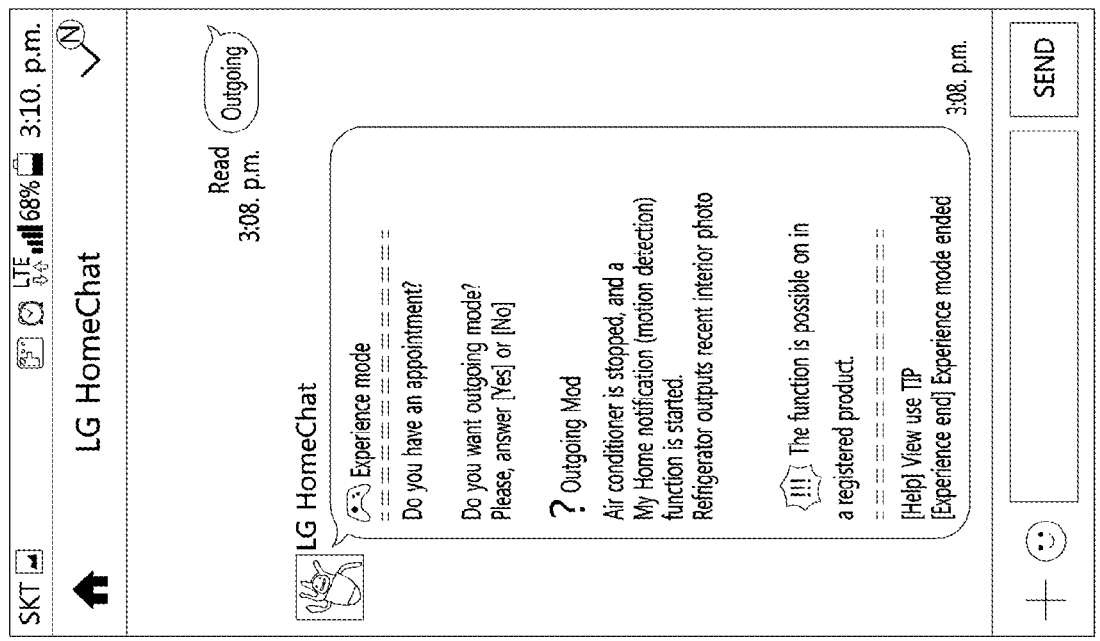
FIGS. 21 to 23 are views showing the states that an outgoing mode is executed.
Figure 22:
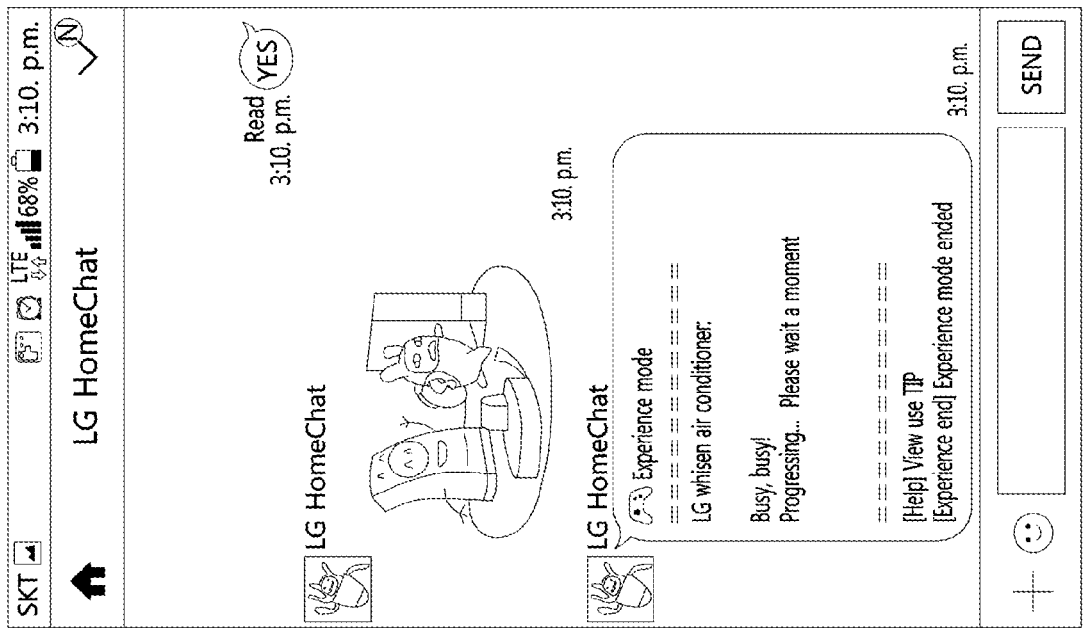
Figure 23:
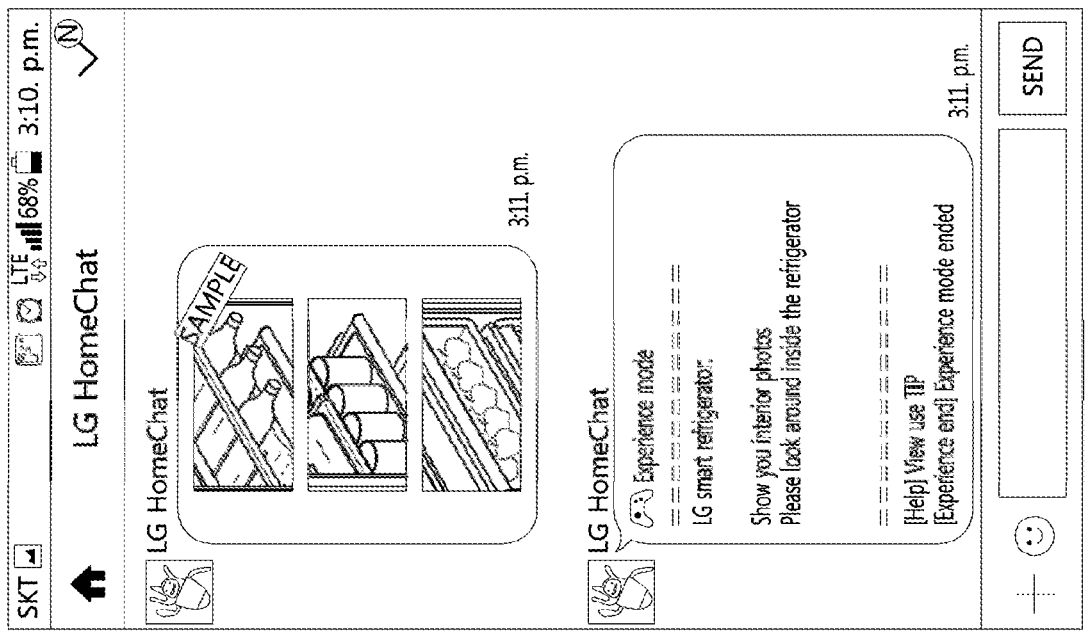

FIGS. 21 to 23 are views showing the states that an outgoing mode is executed. As shown in FIG. 21, if the user inputs the words of 'outgoing' into the chat window in the basic screen state of FIG. 16, the messenger asks the user about whether the outgoing mode is executed. The outgoing mode is to a mode of automatically stopping the operations of products that does not cause problems even if the products are stopped when the user goes out. In addition, the outgoing mode is to start the operation of the home appliances having a security function. In addition, the outgoing mode is to provide photos of the internal appearance of the refrigerator such that the user may determine articles to be purchased in a mar when the user goes out.

FIG. 22 is a view showing a content output by a messenger when a user does not receive the response to an input from the management server 300 within a predetermined time. The electronic device 302 does not receive the response from the management server 300 within a predetermined time when the traffic jam occurs in communication. In this case, the messenger 303 may display a message of notifying the user of the relevant content on the chat window.

FIG. 23 is a view showing the photo of the internal appearance of the refrigerator when the user executes the outgoing mode. In detail, the messenger receives an input of executing the outgoing mode and transmits the input to the management server 300. The management server 300 generates a control signal of photographing the internal appearance of the refrigerator based on the received input and transmits the control signal to the refrigerator.

In detail, the user may go out to purchase an article in a mart. In this case, if the electronic device 302 displays the photos of the internal appearance of the refrigerator through the messenger, the user may detect foods currently stored in the refrigerator and may effectively purchase the article.

Figure 24:
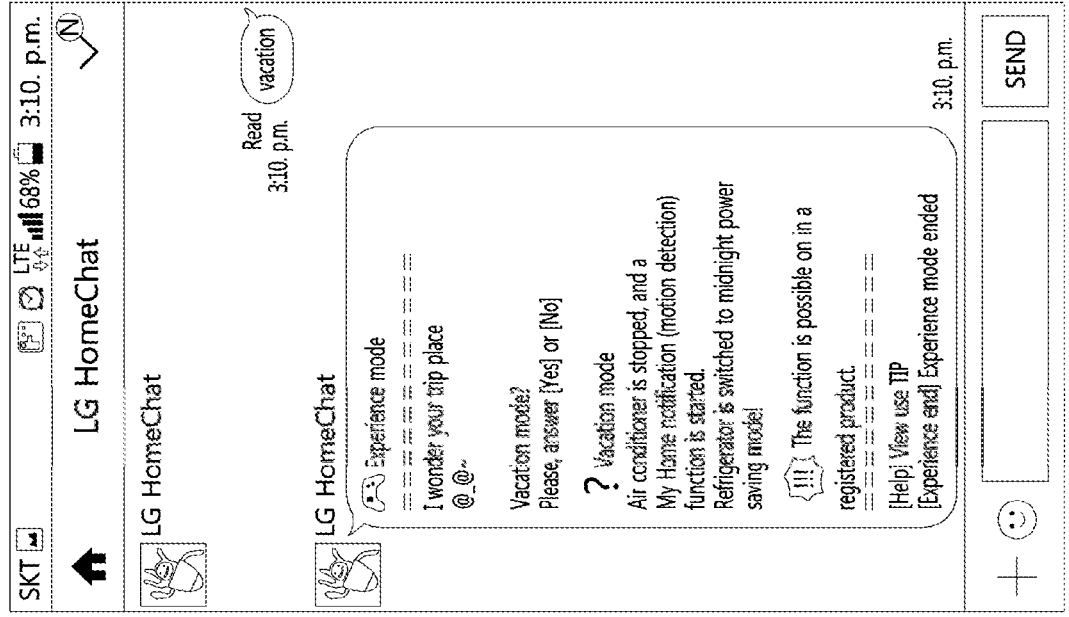
FIGS. 24 to 25 are views showing the states that a vocation mode is executed.
Figure 25:
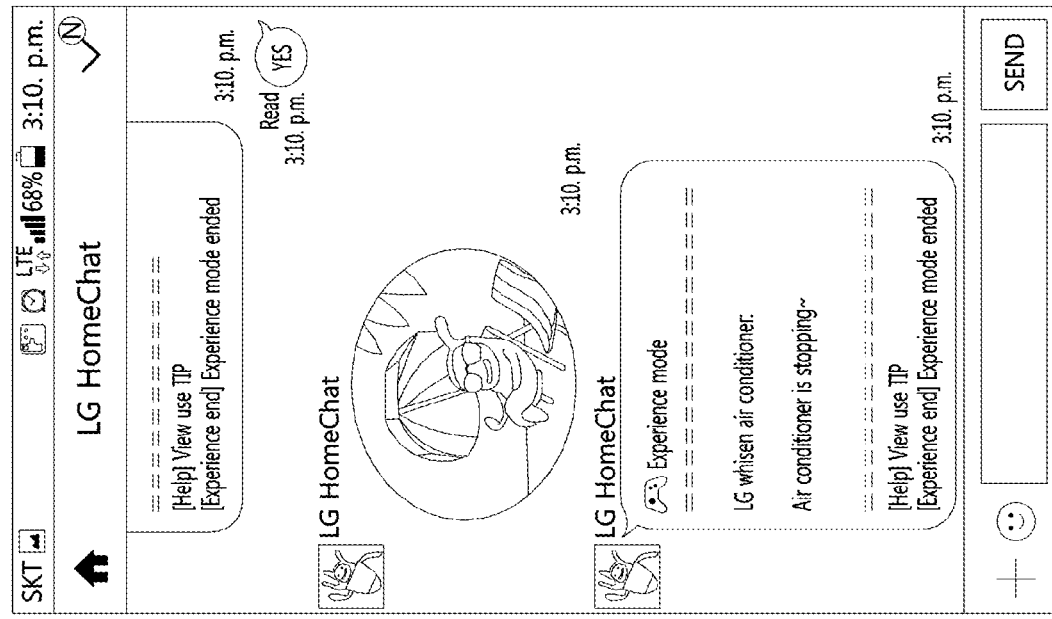

FIGS. 24 to 25 are views showing the states that a vocation mode is executed. As shown in FIG. 24, if a user inputs a word of 'vacation' into the chat window in the basic screen state of FIG. 16, the messenger 303 displays a message of asking whether the vacation mode is executed. In the vacation mode, operations are performed similarly to those of the outgoing mode. However, different from the outgoing mode, the control of operating the refrigerator in a power saving mode is additionally performed since the user empties house for a long term.

As shown in FIG. 25, if the user approves the execution of the outgoing mode, the messenger 303 displays the content of stopping the operation of the air conditioner on the chat window. In detail, if the electronic device 302 receives the input of the vacation mode through the messenger 303, the electronic device 302 transmits the input of the vacation mode to the management server 300. The management 300 generates control signal of stopping the operation of the air conditioner based on the input and transmits the control signal to the air conditioner.

Figure 26:
FIGS. 26 to 28 are views showing the cases that a home return mode is executed.
Figure 27:
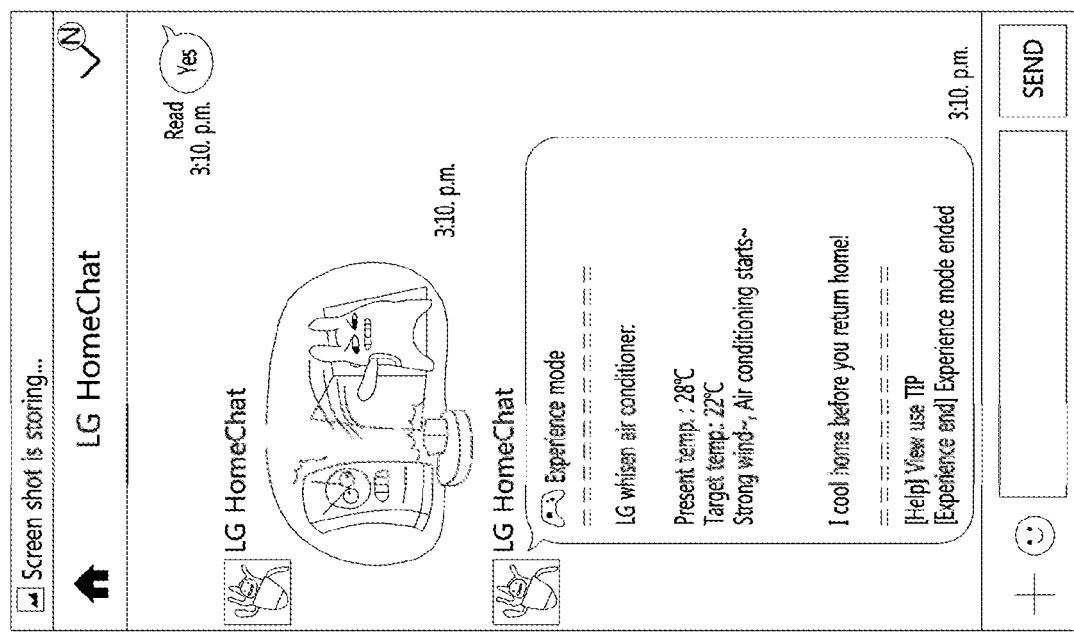
Figure 28:
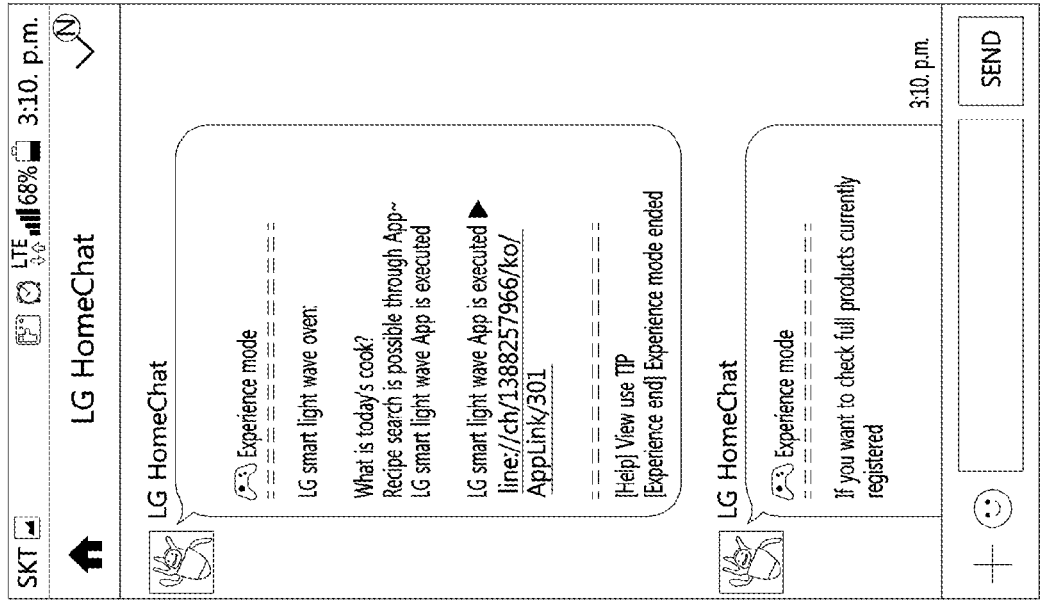

FIGS. 26 to 28 are views showing the cases that a home return mode is executed. As shown in FIG. 26, if a user inputs 'home return' to the chat window in the basic state of FIG. 16, messenger 303 displays a message of asking whether the home return mode is executed on the chat window. In the home return mode, the user may operate air conditioner or the dehumidifier in advance or may search for the recipe of the oven.

As shown in FIG. 27, if the user approves the execution of the home return mode, the messenger 303 displays the content of operating the air conditioner before the user returns home on the chat window. In detail, if the electronic device 302 receives the input of the home return mode through the messenger 303, the electronic device 302 transmits the input of the home return to the management server 300. The management 300 generates a control signal of starting the operation of the air conditioner based on the input and transmits the control signal to the air conditioner.

In addition, as shown in FIG. 28, if the user approves the execution of the home return mode, the messenger 303 displays an address of executing an application for searching for the recipe to be cooked through the oven. The user may access the application by touching the address displayed on the chat window and may search for the recipe to be cooked in advance before the user returns home.

In addition, the user may detect foods currently stored in the refrigerator while searching for the recipe. In detail, the electronic device 302 may display the photos of the internal appearance of the refrigerator, which corresponds to the execution of the home return mode, on the chat window through the messenger. The user may detect the searched recipe and the foods currently stored, and may determine a cook to be cooked after returning home.

FIGS. 29 to 32 are views showing controlling an air conditioner through a messenger according to an embodiment.

Figure 29:
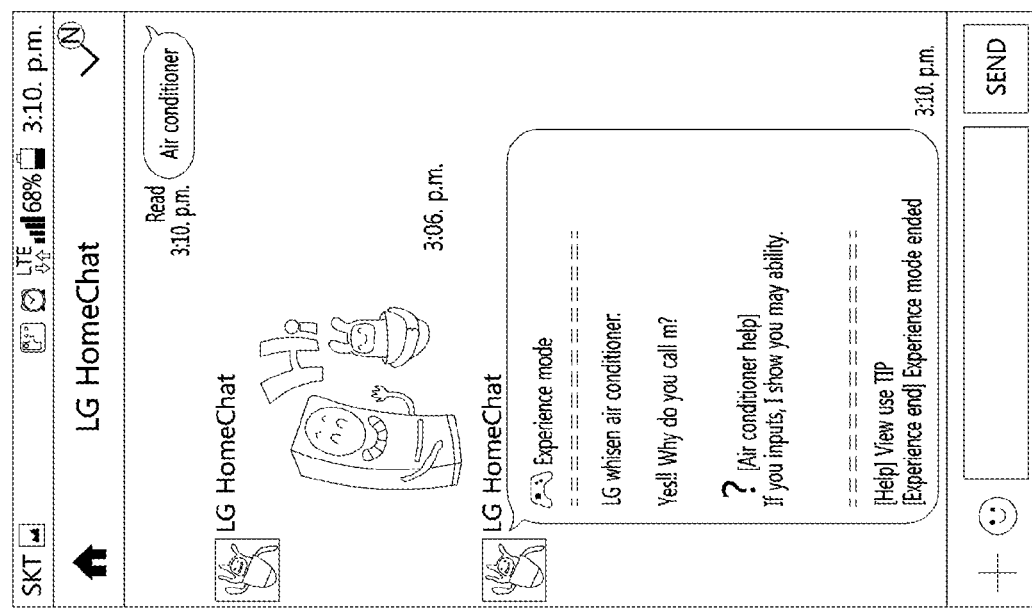
FIGS. 29 to 32 are views showing controlling an air conditioner through a messenger according to an embodiment.

As shown in FIG. 29, a user may input the term of an air conditioner which is a home appliance to be controlled into the chat window. If the user inputs the term of the air conditioner into the chat window, the electronic device 302 may acquire a control power over the air conditioner as the electronic device is connected with the management server through the messenger. In addition, the electronic device 302 may introduce an air conditioner help of guiding a necessary command for allowing a user to control the air conditioner through the messenger.

If the user inputs the words of 'air conditioner help' into the chat window, the messenger 303 displays the list of commands for controlling the air conditioner on the chat window. Helps may be varied depending on home appliances. In addition to the command shown in FIG. 30, another command may be added through the update.

Figure 30:
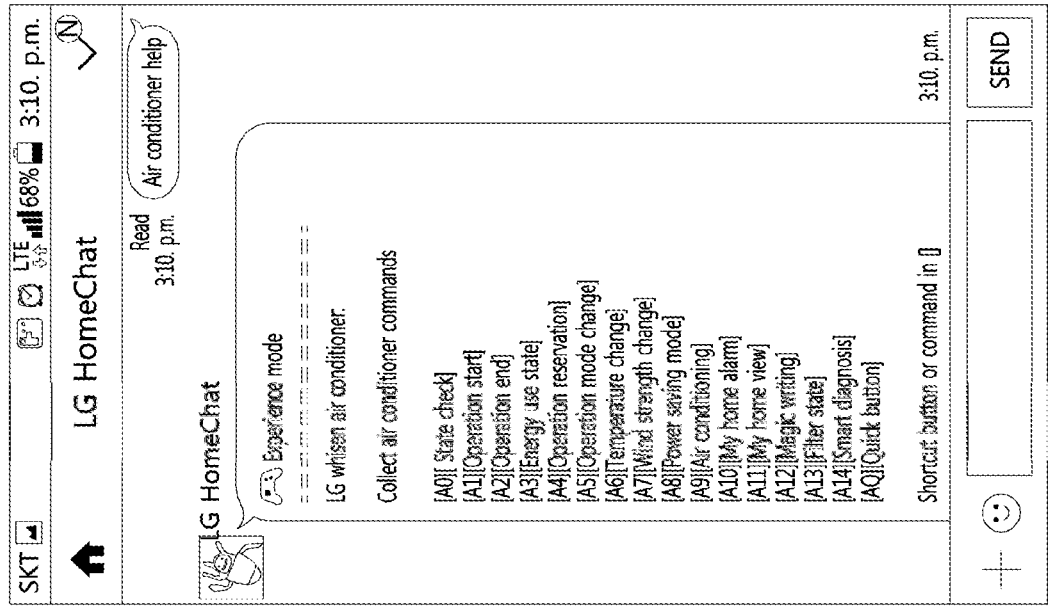
Figure 31:
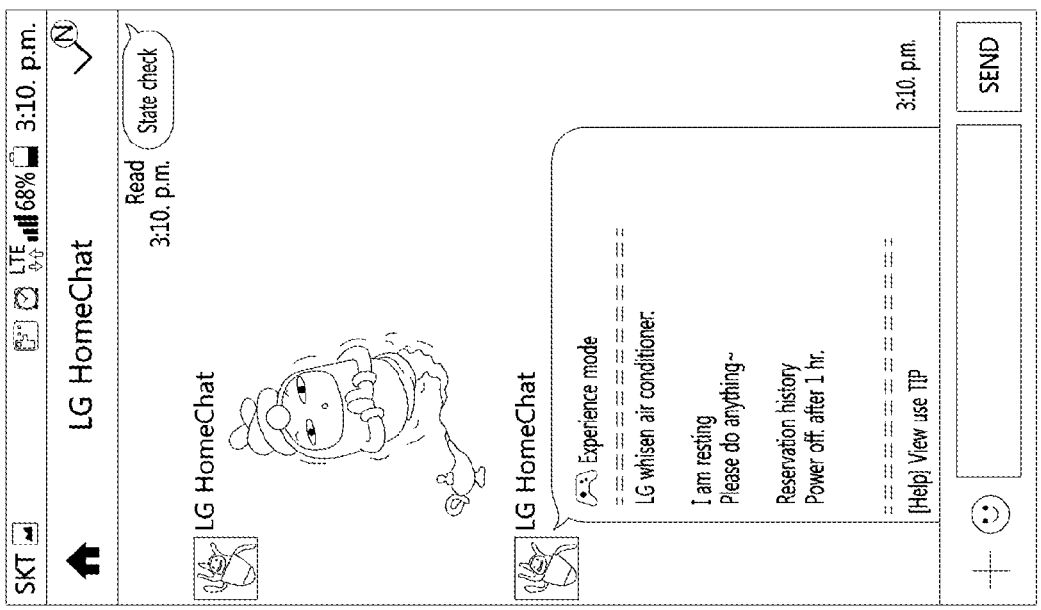

FIG. 31 shows that the user inputs the command of 'state check' among commands shown in FIG. 30 into the chat window. If the user inputs the command of the 'state check', the electronic device 302 receives the present state of the air conditioner through the management server 300. In addition, the electronic device 302 displays the present state of the air conditioner received through the messenger 303. As shown in FIG. 31, the displayed information of the present state may include present operation information or a reservation history.

Figure 32:
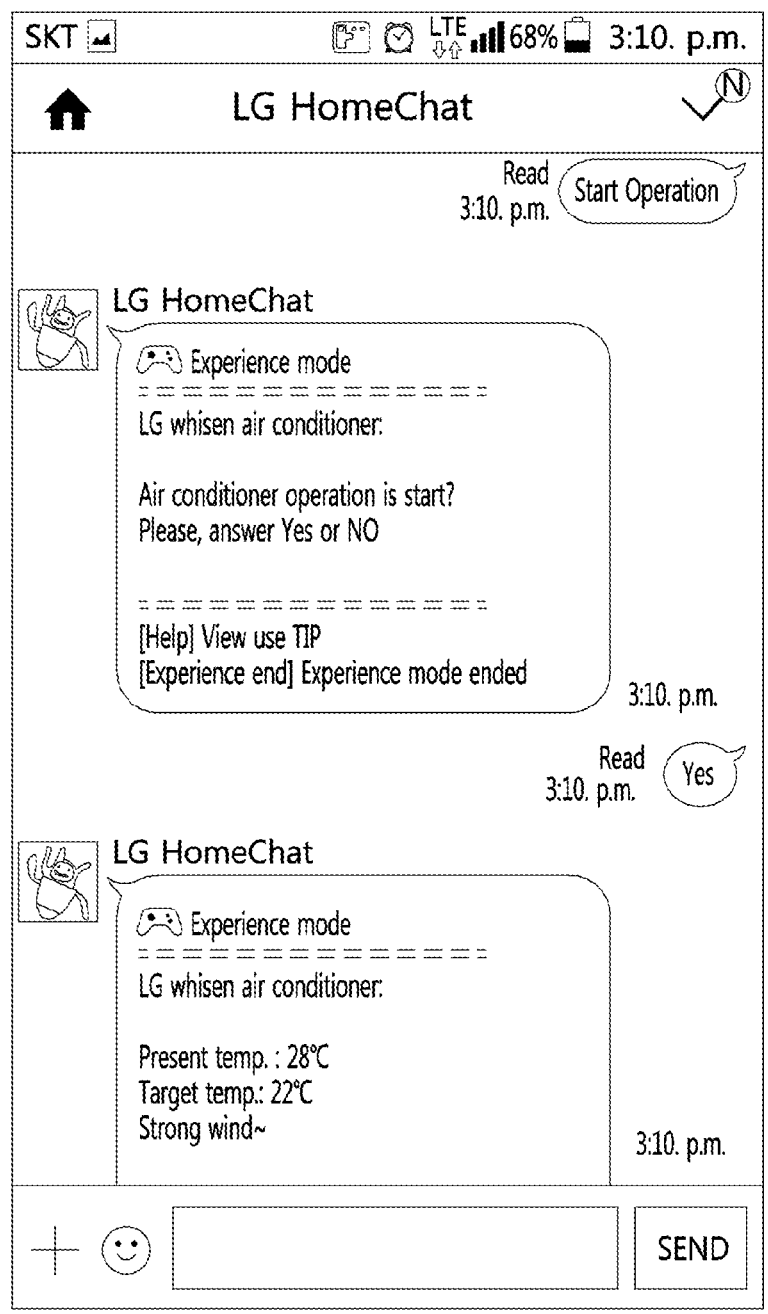

FIG. 32 shows that the user inputs the command of 'operation start' among commands shown in FIG. 30 into the chat window. If the user inputs the command of 'operation start', the messenger 302 displays a content of asking whether the operation of the air conditioner is executed, on the chat window. If the user approves the operation start of the air conditioner, the electronic device 303 transmits the operation command to the management server 300.

Figure 33:
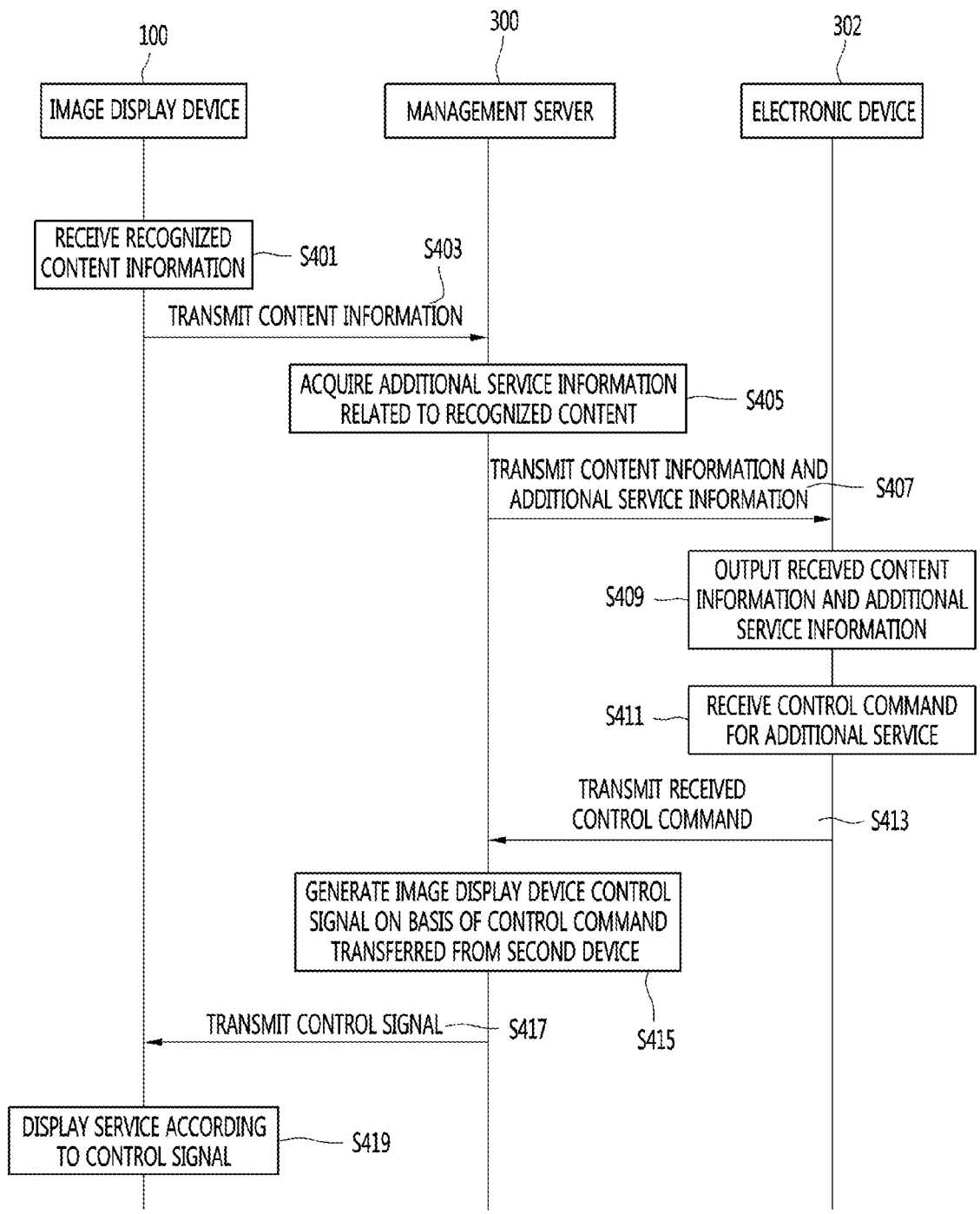
FIG. 33 is a flowchart showing a method of controlling an image display device and other home appliances through an application of an electronic device according to an embodiment of the present invention.

FIG. 33 is a flowchart showing a method of controlling the image display device and other home appliances through an application of an electronic device according to an embodiment of the present invention. Hereinafter, the electronic device will be described as the representative example of a smart phone, and the application will be described as the representative example of the messenger.

The image display device 100 receives recognized content information (S401). As described above, the image display device 100 receives uncompressed AV content and extracts feature information from the received uncompressed AV content. The image display device 100 transmits the extracted content information to the content recognizing service providing server 20 and acquires content information. The feature information may include ail of a watermark and a fingerprint.

The image display device 100 transmits the acquired content information to the management server 300 (S403). In detail, the image display device 100 acquires information of the uncompressed AV content which is currently reproduced through an ACR function, and transmits the acquired information to the management server 300.

The management server 300 acquires enhanced service based on the received content information (S405). According to an embodiment, the image display device 100 may transmit information on the enhanced service together with the content information. In this case, the image display device 100 may transmits the acquired content information to the content recognizing service providing server 50 and may acquire the information of the enhanced service in response to the content information. The information of the enhanced service may include the enhanced address and an address for acquiring the enhanced service.

According to another embodiment, the management server 300 may transmit the received content information to the enhanced service providing server 50 and may acquire the information on the enhanced service in response to the content information. In this case, the management server 300 may transmit the information on the enhanced service, which is acquired from the enhanced service providing server 50, to the image display device 100. The image display device 100 may output an indication of notifying the acquisition of the enhanced service on a display unit.

The management server 300 transmits the acquired information on the enhanced service and the content information to the electronic device 302 (S407). In detail, the management server 300 transmits the information of the enhanced service and the content information, which are received from the image display device 100 and the directly received from the management server 300, to the electronic device 302.

The electronic device 302 outputs the information of the enhanced service and the content information which are received from the management server 300 (S409). According to an embodiment, the electronic device 302 the information on the enhanced service or the enhanced service received through the messenger 303 on the chat window. According to another embodiment, the electronic device 302 displays the uncompressed AV content, which is currently reproduced on the image display device 100, on the chat window of the messenger 303. The user may detect the information of the AV content, which is currently viewed, based on information displayed on the chat window of the messenger 303. In addition, the user may recognize the existence of the enhanced service associated with the AV content, which is currently viewed, based on the information of the enhanced service displayed on the chat window.

The electronic device 302 receives a control command of the user in relation to the content displayed on the chat window of the messenger 303 (S411). According to an embodiment, the electronic device 302 may receive the control command based on chatting content of the user input into the chat window of the messenger 303. According to another embodiment, the electronic device 302 may receive the control command through voice of the user. In addition, the electronic device 302 may convert the voice of the user into a text.

Hereinafter, the details of operations S409 and S411 will be described with reference to FIGS. 34 to 39.

Figure 34:
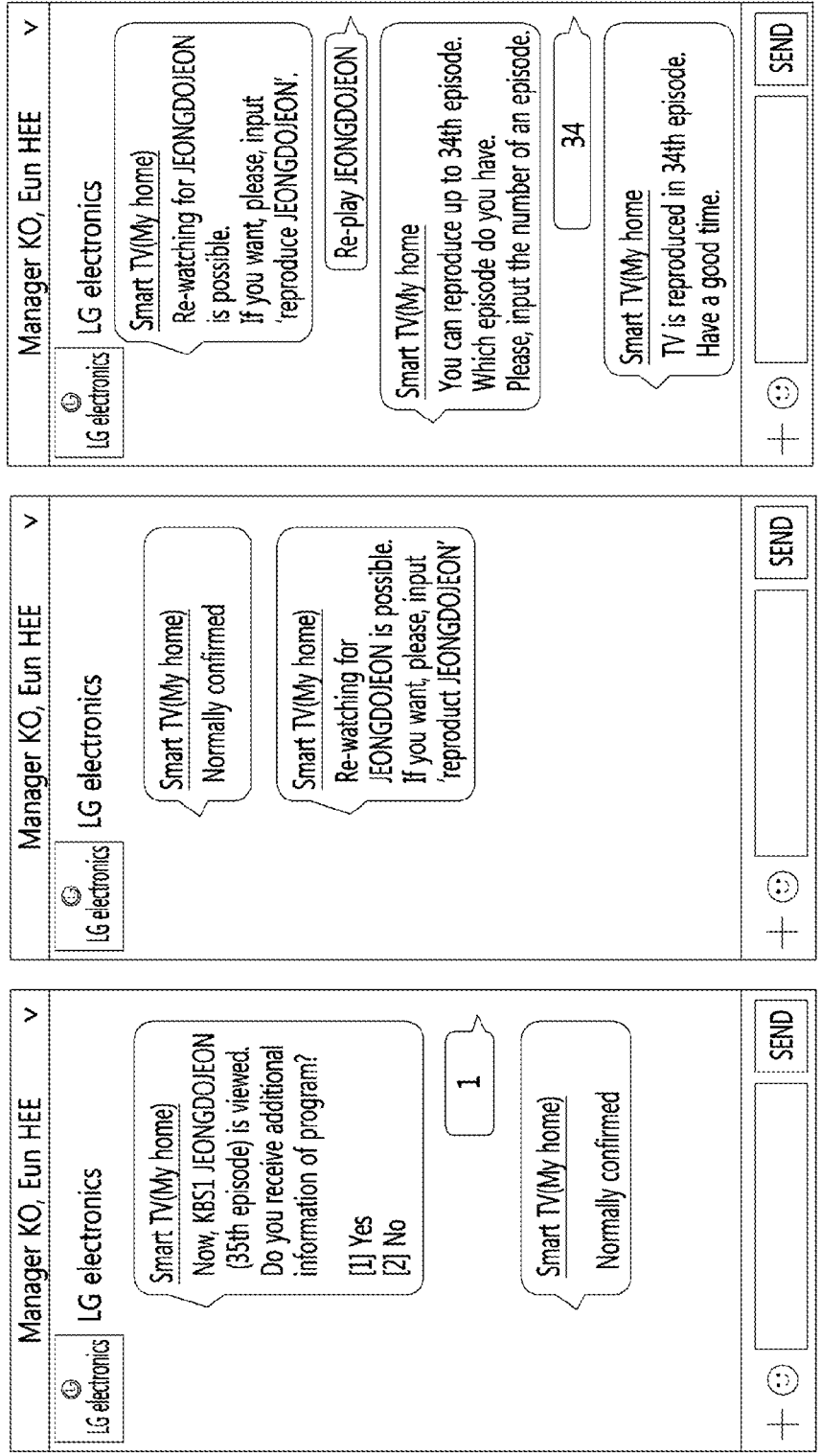
FIG. 34 is a view showing that the re-watching of another content related to content recognized through an ACR function of an image display device by a user is controlled through a messenger of an electronic device.

FIG. 34 is a view showing that the re-watching of another content related to content recognized through the ACR function of the image display device 100 by a user is controlled through the messenger 303 of the electronic device 302. As described above, the electronic device 302 receives the AV content information, which is currently viewed, and the information of the enhanced service from the management server 300.

Accordingly, as shown in FIG. 34, the electronic device 302 may output the information on the AV content, which is currently viewed, through the chat window of the messenger 303 while asking the user about whether the user receives the relevant enhanced service. If the user approves the receiving of the relevant enhanced service, the electronic device 302 may display content of asking the re-watching program to be output to the image display device 100 on the chat window of the messenger 303. In addition, the electronic device 302 may receive the response to the relevant query through the chat window. As shown in FIG. 34, if the user inputs the words of 're-watching of 'JEONGDOJEON', the content of another episode of 'JEONGDOJEON', which is currently reproduced, may be reproduced by the image display device 100. Alternatively, the electronic device 302 may display the list of currently available enhanced services including a re-watching service on the chat window of the messenger 303 and may receive the input of the user selected from the service list. Alternatively, the user may be induced to input the words of 'help of smart TV' into the chat window. If the input is received, the list of currently available enhanced service may be displayed.

If the user approves the execution of the re-watching service, the electronic device 302 may query an episode to be viewed through the chat window of the messenger 303. In addition, the electronic device 302 may receive a plurality of episodes. In addition, the electronic device 302 may receive the reservation about time in which the selected re-watching program is to be reproduced.

According to another embodiment, the image display device 100 may recognize the broadcast of a preview through the ACR function when the preview of specific content is broadcasted. The image display device 100 may transmit the information on the preview to the electronic device 302 through the management server 300. The electronic device 302 displays information on the preview. The electronic device 302 displays information on the preview through the messenger 303. The user may set the reservation based on the preview displayed through the chat window of the messenger 303. For example, the electronic device 302 may display preview information that specific content is going to be broadcasted at 6 p.m. on the chat window, and may display the query about a reservation on the chat window. The user inputs the message of a reservation approved into the chat window. The electronic device 302 stores the reservation information. According to another embodiment, the management server 300 may store the reservation information.

In addition, if the reservation time to broadcast the content based on the reservation information arrives, the electronic device may display a reminder for the user through the messenger 303. In detail, the electronic device 302 may display information that reproduction time of the relevant content is imminent through the messenger 303 when the time based on the stored reservation information arrives. In addition, the electronic device 302 may display, on the chat window, the content of querying whether to operate the image display device 100 in order to reproduce the content. The electronic device 302 receives a user control command for the query content and transmits the user control command to the image display device 100 through the intermediate server 300.

Figure 35:
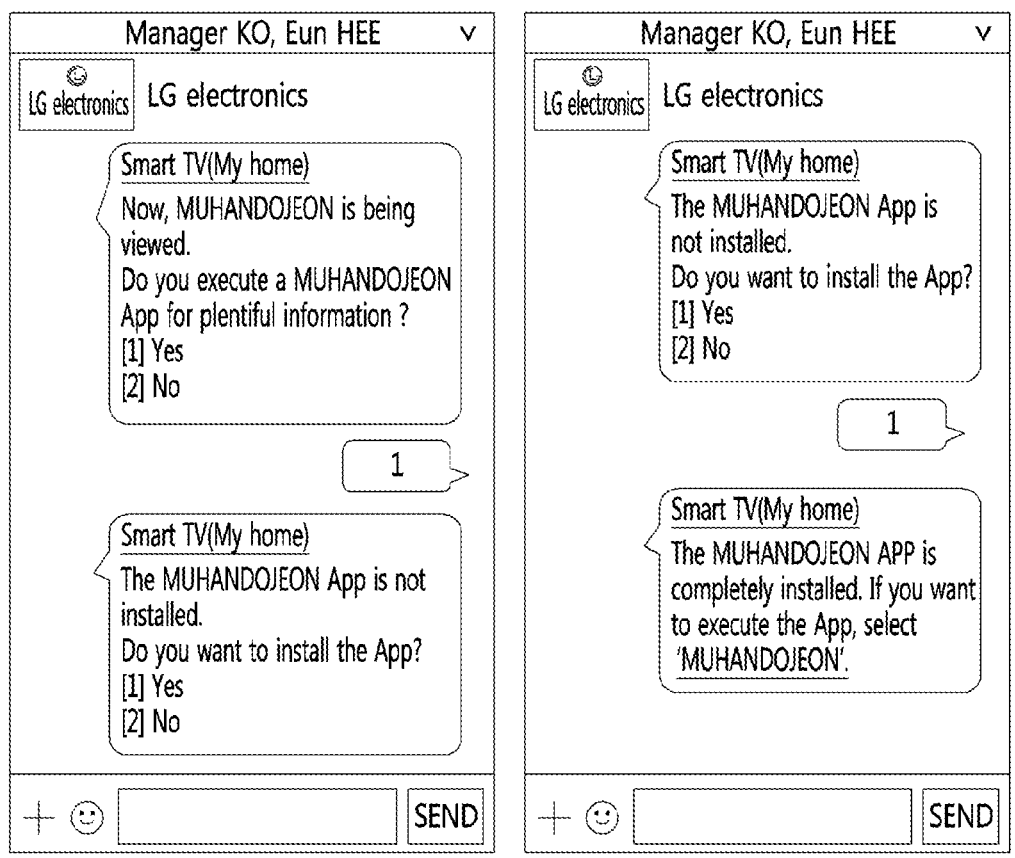
FIG. 35 is a view showing that an app interworking with a currently viewed audio-visual content is controlled by an electronic device.

FIG. 35 is a view showing that an app interworking with the currently viewed AV content is controlled by the electronic device 302. The electronic device 302 receives information on the currently AV content from the management server 300. The electronic device 302 may install and execute the app interworking with the relevant content based on the received content information.

In detail, the electronic device 302 may display the information on the existence of the app interworking with the currently viewed AV content and the execution state of the app through the chat window of the messenger 303. The app interworking with the content may provide information on time to broadcast the content, content staffs, a free bulleting board of the content, or an event related to the content. The user may install the app of preference content in the mobile device or the like and may collect various pieces of information related to the preference content through the app. In addition, the user may participate in the event related to the content. In addition, the user may upload an opinion about the content through a free bulletin board or a social network.

When the electronic device 302 does not currently install the app interworking with the AV content therein, the electronic device 302 may display the content of the query of the installation state on the chat window. If the user inputs content of approving the query into the chat window, the electronic device 302 may automatically access an app store and install the interworking app.

Meanwhile, the electronic device 302 may display the address of a homepage of the relevant content on the chat window when the user does not approve the execution of the interworking app.

FIG. 36 is a view showing that a coupon service is provided as one example of the enhanced service. Vendors may cooperate with a content provider in order to advertise products. As one example of the advertisement, the coupon of the product may be provided for a viewer who views the relevant content. In addition, the content provider may provide the coupon of a product for the content provider to increase the ratings. Accordingly, the electronic device 302 may receive the enhanced service including the coupon service from the management server 300 and may display the coupon service through the chat window of the messenger 303.

In addition, according to an embodiment described with reference to FIG. 36, a raffle service may be provided. In detail, the electronic device may display a simple quiz related to the currently reproduced content and serving as one example of the enhanced service on the chat window and may query the answer to the quiz. The user may recognize the content reproduced in the image display device 100 while recognizing the answer. If the user inputs the answer, the user automatically participates in the event of the raffle, and the electronic device 302 may display the result of the raffle through the chat window. In this case, the user may concentrate to the relevant AV content and may fixedly view the content. Accordingly, the present embodiment may be utilized as one marketing method of increasing the ratings.

FIG. 37 is a view showing that the image display device 100 recognizes an indirect advertisement inserted into the AV content as one example of the enhanced service to provide a purchase service. A drama or an entertainment content may partially include an indirect advertisement. The indirect advertisement may produce an advertisement effect of a relevant produce by exposing to a user that a famous actor or actress uses a specific product under a more natural situation, which is different from a general advertisement.

On the assumption that the currently-viewed content is a drama, the actress of the drama, which is being played, may appear with a specific-brand bag.

According to an embodiment, in related to the above-described situation, the image display device 100 may photograph feature information by extracting a brand-logo exposed through the indirect advertisement. If the extracted brand logo information is received by the management server 300, the management server 300 may acquire information on the enhanced service related to the purchase based on information on the relevant logo and the content. For example, the management server 300 may provide an address of a purchase site of the relevant brand to the electronic device 302 and may display the address on the chat window. Alternatively, the relevant brand may serve as a search index and may be searched in the purchase app installed in the electronic device 302. The electronic device 302 may display the content received from the management server on the chat window through the messenger 303 or may automatically execute the purchase app.

According to another embodiment, the image display device 100 or the management server 300 may acquire an enhanced service for purchase by utilizing a scene, in which the actress puts on the specific-brand bag, as a scene. For example, the content providing server 10 may set the scene, in which the actress puts on the specific-brand bag, to the feature information, the image display device 100 extracts the relevant scene and may utilize the feature information (fingerprint). Alternatively, the content providing server 10 or the content recognizing service providing server 20 may provide the feature information through a method of inserting a watermark into a segment including the scene in which the actress puts on the specific-brand bag. According to the embodiment, the method may be utilized even in a scene, in which the brand is officially not exposed, through the cooperation between the content provider and the vendor, which is different from the method of extracting the brand logo.

Figure 38:
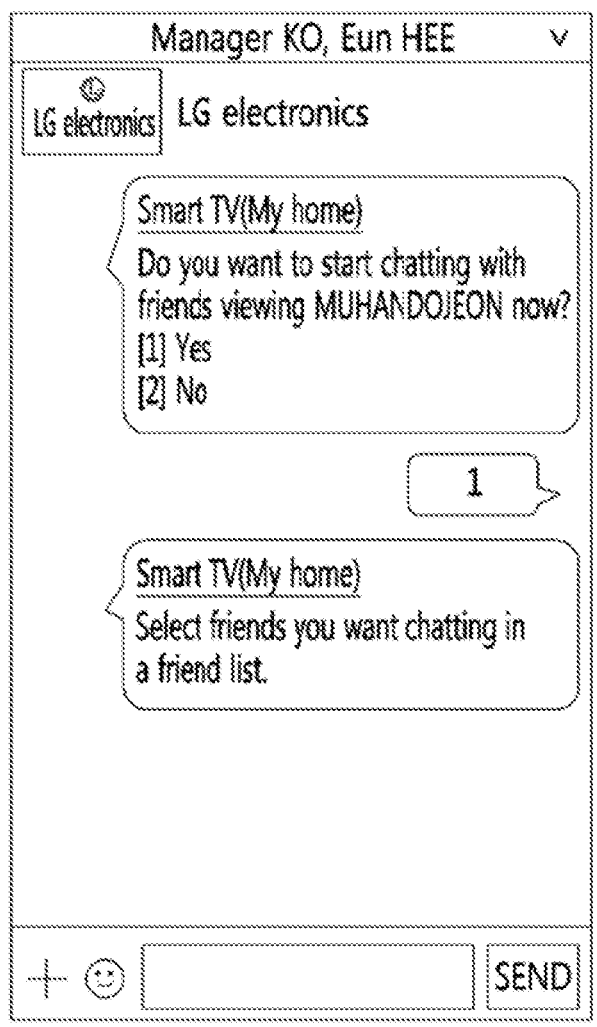
FIG. 38 is a view showing that a chatting service is performed as the enhanced service according to an embodiment.

FIG. 38 is a view showing that a chatting service is performed as the enhanced service according to an embodiment. In the case of famous content, a large number of viewers may simultaneously view the relevant content. Accordingly, there may be a friend, who views content currently viewed by a viewer, among friends registered in the messenger 303. Accordingly, there may be provided a service of forming an additional chatting room including relevant friends so that the friends view the content while making conversation.

In detail, a plurality of image display devices and electronic devices may be connected with the management server 300. In addition, the management server 300 may receive information on currently-viewed information for each image display device. Accordingly, the management server 300 may acquire the information on image display devices, in which the same content is currently viewed, and the electronic device 302 connected with the relevant image display device.

If the management server 302 receives an input of approving the execution of the chatting service from the electronic device 302, information on other viewers, who view the currently viewed content, based on the acquired information is transmitted to the electronic device 302. The electronic device 302 displays the acquired list of viewers on the chat window. The viewer may determine friends to be invited into the chatting room based on the list displayed on the chatting room.

According to another embodiment, the electronic device 302 may display content of querying whether a message for viewing recommendation is sent to a messenger friend who does not a current content on the chat window.

Figure 39:
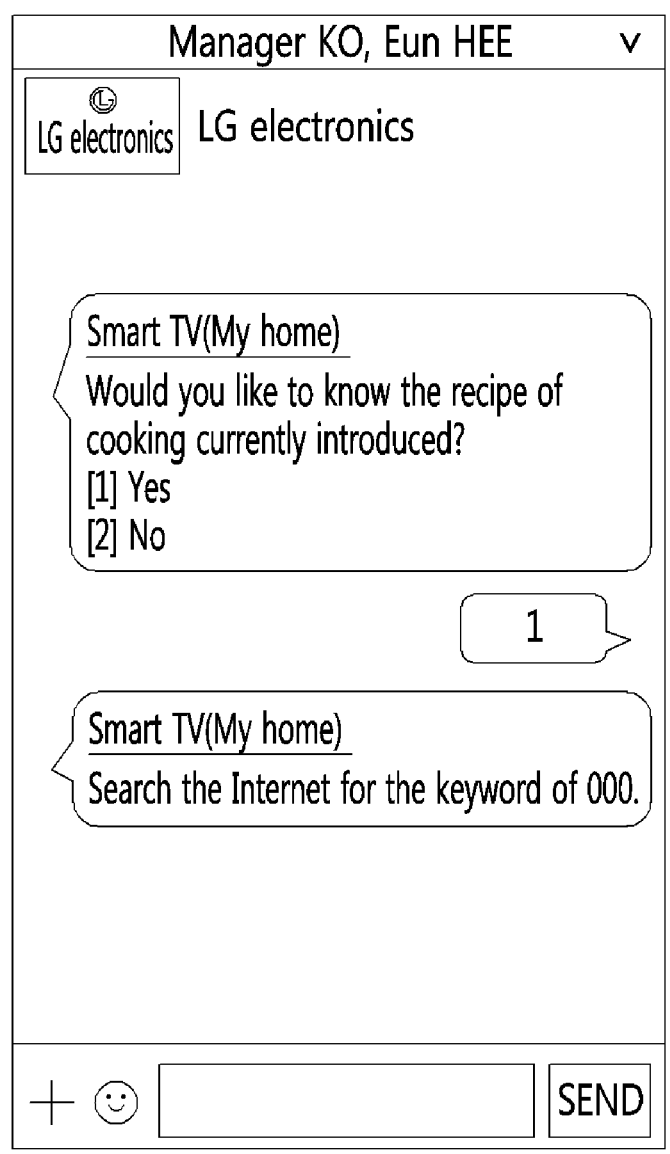
FIG. 39 is a view showing that recipe information is provided for one example of an enhanced service.

FIG. 39 is a view showing that the information on a recipe is provided as the enhanced service according to an embodiment. Content that is currently reproduced by the image display device 100 may be a cooking program. In this case, a user may want to acquire the detailed recipe related to the relevant cook. Accordingly, the information on the enhanced service including information on the recipe may be acquired based on the content information of the cooking program acquired by the management server 300 and may be transmitted to the electronic device 302. The information on the enhanced service acquired by the electronic device 302 may include a simple recipe, information on a site address having recipe information, and an app connection address for providing the recipe.

Meanwhile, the electronic device 302 may provide recipe information and may display the recipe information and information on the foods currently stored in a refrigerator through the chatting window if the refrigerator is connected with the electronic device 302. In addition, in the case of the recipe based on an oven, content of querying whether the oven is preheated may be displayed through the chatting window.

According to another embodiment, when the image display device 100 recognizes that a weather related program is played, the electronic device 302 may display content for the control of an air conditioner through the chatting window based on the information on the relevant content. For example, if the viewer acquires information that it is very hot tomorrow through the weather program, the viewer may input the content of operating the air conditioner through the chatting window or may input reservation settings through the chatting window. Alternatively, if the viewer acquires the information that current humidity is significantly high, the viewer may input the content of operating the humidity through the chatting window.

According to the present embodiment, the weather information acquired from the image display device 100 is immediately reflected and a product at home may be controlled.

Hereinafter, FIG. 33 is described again.

The electronic device 302 transmits the control command of the user corresponding to each embodiment to the management server 300 (S413). The electronic device may transmit the control command in the form of a text. In addition, if the received control command is a voice input, the voice input is transmitted without change or the voice input converted into the text may be transmitted.

The management server 300 generates an image display device control signal based on a control command received from the electronic device 302. In detail, the management server 300 generates the image display device control signal corresponding to the command received from the electronic device 302. The control signal may be previously stored in the management server 300, and stored in an additional server and transmitted to the management server 300.

The management server 300 may generate a signal for controlling home appliances other than the image display device 100 based on the control command received from the electronic device 302. For example, when the recipe information is searched in the electronic device 302, the electronic device 302 may transmit the control command of the preheating of the oven to the management server 300. The management server 300 may generate a control signal for the oven based on the relevant control command.

The management server 300 transmits the generated control signal to the image display device 100 (S419). For example, if the control command for 're-watching' is received from the electronic device 302, a reproduction signal of playing an episode according to the control command is transmitted. Further, in step S415, as described above, the control signal may be transmitted to other home appliances in addition to the image display device 100.

The image display device 100 operates based on the control signal received from the management server 300. In detail, the image display device 100 receives content corresponding to the received control signal and displays the content. In addition, the home appliances other than the image display device 100 may perform the natural operation based on the control signal.

The present invention mentioned in the foregoing description may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and a carrier wave (for example, a transmission over the Internet).

The above-described image display device is not limited to the above-described configurations and methods of the embodiments, but the embodiments may have various modifications by selectively combining the entire portion or a portion of each embodiment with that of another embodiment.

The invention claimed is:

1. A method of operating an electronic device to control an image display device, the method comprising:
controlling a plurality of home appliances through a first application, wherein the plurality of home appliances include at least two of a refrigerator, a washing machine, an air conditioner, an oven, or a robot cleaner, wherein the first application is a messenger application performing a mutual message exchange function;

receiving, by the electronic device, from a management server, uncompressed audio-visual information and an enhanced service content, based on received recognized content information transmitted from the image display device to the management server, wherein the recognized content is recognized through an automatic contents recognition (ACR) function performed in the image display device;

displaying the uncompressed audio-visual content information and the enhanced service on a chat window of the first application;

receiving chatting content via the chat window as a control command for executing the enhanced service, wherein the control command includes a command for executing the enhanced service in the image display device;

displaying the chatting content with the uncompressed audio-visual content information and the enhanced service on the chat window of the first application; and transmitting the control command to the management server, wherein the displaying the uncompressed audio-visual content information and the enhanced service on the chat window of the first application comprises:

displaying information, received from the management server, to control a specific home appliance relating to the uncompressed audio-visual content information or the enhanced service, among the plurality of home appliances, based on the uncompressed audio-visual content information or the enhanced service, wherein the information to control the specific home appliance is displayed on the chat window of the first application, wherein the receiving the chatting content via the chat window comprises:

receiving the chatting content via the chat window as the control command for controlling the specific home appliance, and wherein the transmitting the control command to the management server comprises:

transmitting the control command for controlling the specific home appliance to the management server.

2. The method of claim 1, wherein the enhanced service includes a re-watching service, and
wherein the control command for executing the enhanced service in the image display device includes a content selection command for selecting another audible-visible content associated with the uncompressed audio-visual content.

3. The method of claim 2, further comprising receiving a first reservation command for reserving reproduction time of content selected according to the content selection command.

4. The method of claim 1, wherein the enhanced service includes a service of executing a second application interworking with the uncompressed audible-visual content, and
wherein the control command includes an interworking application execution command for executing the second application and an interworking application installation command for installing the second application in case the second application is not installed in the electronic device.

5. The method of claim 1, wherein the enhanced service includes product information extracted from the uncompressed audio-visual content, and
wherein the control command includes a purchase application execution command for executing a third application including a purchase and product searching function based on the product information.

6. The method of claim 1, wherein the enhanced service includes a chatting service,
the method further comprising displaying a list of friends who currently view the uncompressed audio-visual content to the first application, and
wherein the control command includes a friend selection command for selecting a friend who is to be invited to chatting, the friend selected from the list of friends.

7. The method of claim 1, wherein the enhanced service includes a viewing reservation service based on content preview information acquired from the management server, and
wherein the command for executing the enhanced service in the image display device includes a second reservation command for setting a viewing reservation of a content corresponding to the content preview information.

8. The method of claim 7, further comprising displaying a reminder of the viewing reservation on the chat window based on the set viewing reservation.

9. An electronic device to control an image display device, the electronic device comprising:
a wireless communication unit configured to receive, from a management server, uncompressed audio-visual information and an enhanced service content, based on received recognized content information transmitted from the image display device to the management server, wherein the wireless communication unit is coupled to one or more networks, wherein the recognized content is recognized through an automatic contents recognition (ACR) function performed in the image display device;
a display configured to display the uncompressed audio-visual content information and the enhanced service on a chat window of a first application, wherein the first application is a messenger application performing a mutual message exchange function;
a touch sensor configured to receive chatting content via the chat window as a control command for executing the enhanced service displayed on the chat window, wherein the control command includes a command for executing the enhanced service in the image display device; and
a processor operably coupled to the wireless communication unit, the display, and the touch sensor, and configured to: process signals, data or information, inputted or outputted through the display, the wireless communication unit and the touch sensor;
control the display to display the chatting content with the uncompressed audio-visual content information and the enhanced service on the chat window of the first application;
control the wireless communication unit to transmit the control command to the management server;
control a plurality of home appliances through the first application, wherein the plurality of home appliances include at least two of a refrigerator, a washing machine, an air conditioner, an oven, or a robot cleaner;
control the display to display information, received from the management server, to control a specific home appliance relating to the uncompressed audio-visual content information or the enhanced service, among the plurality of home appliances, based on the uncompressed audio-visual content information or the enhanced service, wherein the information to control the specific home appliance is displayed on the chat window of the first application;

receive the chatting content via the chat window as the control command for controlling the specific home appliance; and control the wireless communication unit to transmit the control command for controlling the specific home appliance to the management server.

10. The electronic device of claim 9, wherein the enhanced service includes a re-watching service, and wherein the touch sensor is further configured to receive, through the first application, a content selection command for selecting another audible-visible content associated with the uncompressed audio-visual content.

11. The electronic device of claim 10, wherein the touch sensor is further configured to receive a first reservation command for reserving a reproduction time of content selected according to the content selection command.

12. The electronic device of claim 9, wherein the enhanced service includes a service of executing a second application interworking with the uncompressed audible-visual content, and wherein the touch sensor is further configured to receive, through the first application, an interworking application execution command for executing the second application and an interworking application installation command for installing the second application in case the second application is not installed.

13. The electronic device of claim 9, wherein the enhanced service includes product information extracted from the uncompressed audio-visual content, and wherein the touch sensor is further configured to receive, through the first application, a purchase application execution command for executing a third application including purchase and product searching based on the product information.

14. The electronic device of claim 9, wherein the enhanced service includes a chatting service, wherein the processor is further configured to control the display to display a list of friends who currently view the uncompressed audio-visual content through the first application, and wherein the touch sensor is further configured to receive, through the first application, a friend selection command for selecting a friend who is to be invited to chatting and is selected from the list of friends.

15. The electronic device of claim 9, wherein the control command further includes a character input and a voice input.

16. The electronic device of claim 15, wherein, when the control command is the voice input, the processor is further configured to:

convert the voice input into a character input; and control the wireless communication unit to transmit the character input converted from the voice input to the management server.

17. The electronic device of claim 9, wherein the plurality of home appliances are connected with the management server and the image display device comprises a smart TV.

18. The electronic device of claim 17, wherein the plurality of home appliances are connected with the management server via a repeater.

19. The electronic device of claim 9, wherein:

the broadcasted content displayed at the image display device includes a cooking program; and the enhanced service includes information on a recipe obtained based on the cooking program.

20. The electronic device of claim 19, wherein:

at least two of the plurality of home appliances are connected with each other; and the processor is further configured to control the display to display information about foods stored in the refrigerator.

* * * * *